United States Patent
Sengupta et al.

(10) Patent No.: US 12,022,457 B2
(45) Date of Patent: Jun. 25, 2024

(54) UPLINK PRE-COMPENSATION IN WIRELESS COMMUNICATIONS SYSTEMS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Le Liu, San Jose, CA (US); Liangping Ma, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/736,353

(22) Filed: May 4, 2022

(65) Prior Publication Data

US 2022/0361187 A1 Nov. 10, 2022

Related U.S. Application Data

(60) Provisional application No. 63/186,771, filed on May 10, 2021.

(51) Int. Cl.
*H04W 72/12* (2023.01)
*H04B 1/7156* (2011.01)
(Continued)

(52) U.S. Cl.
CPC ........ *H04W 72/121* (2013.01); *H04B 1/7156* (2013.01); *H04W 48/10* (2013.01); *H04W 74/004* (2013.01)

(58) Field of Classification Search
None
See application file for complete search history.

(56) References Cited

U.S. PATENT DOCUMENTS

2010/0111007 A1\* 5/2010 Suo ................ H04L 5/0005
375/132
2015/0270890 A1\* 9/2015 Vasavada ............ H04B 7/195
370/326

(Continued)

FOREIGN PATENT DOCUMENTS

WO WO-2019038294 A1 2/2019
WO WO-2020089471 A1 \* 5/2020 ........... H04B 7/01
WO WO-2020198671 A1 10/2020

OTHER PUBLICATIONS

International Search Report and Written Opinion—PCT/US2022/027913—ISA/EPO—Aug. 11, 2022.

*Primary Examiner* — Noel R Beharry
*Assistant Examiner* — Pamit Kaur
(74) *Attorney, Agent, or Firm* — Holland & Hart LLP

(57) ABSTRACT

Methods, systems, and devices for wireless communication are described. A user equipment (UE) may obtain, via broadcast signaling or UE-specific signaling, an indication of an uplink communications configuration for one or more uplink wireless communications that span a set of one or more transmission time intervals (TTIs). The indication may be based on one or more types of the one or more uplink wireless communications. The UE may determine a duration of time for which an uplink pre-compensation is to be applied to the one or more uplink wireless communications. The duration of time may be based on one or more parameters of the uplink communications configuration. The UE may output the one or more uplink wireless communications within the duration of time with the uplink pre-compensation applied.

30 Claims, 20 Drawing Sheets

(51) Int. Cl.
  *H04W 48/10* (2009.01)
  *H04W 72/121* (2023.01)
  *H04W 74/00* (2009.01)

(56) References Cited

U.S. PATENT DOCUMENTS

| | | | |
|---|---|---|---|
| 2020/0196263 A1* | 6/2020 | Heyn | H04W 56/0005 |
| 2022/0286198 A1* | 9/2022 | Khan | H04W 56/0045 |
| 2022/0393957 A1* | 12/2022 | Wang | H04W 56/0045 |
| 2023/0022798 A1* | 1/2023 | Li | H04B 7/2041 |
| 2023/0056527 A1* | 2/2023 | Medles | H04W 56/009 |
| 2023/0068762 A1* | 3/2023 | Lin | H04W 56/0045 |

* cited by examiner

UPLINK PRE-COMPENSATION IN WIRELESS COMMUNICATIONS SYSTEMS

CROSS REFERENCE

The present application for patent claims the benefit of U.S. Provisional Patent Application No. 63/186,771 by Sengupta et al., entitled "UPLINK PRE-COMPENSATION IN WIRELESS COMMUNICATIONS SYSTEMS," filed May 10, 2021, assigned to the assignee hereof, and expressly incorporated by reference herein.

INTRODUCTION

The following relates to wireless communication, including managing pre-compensation associated with the wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include obtaining, via broadcast signaling or UE-specific signaling, an indication of an uplink communications configuration for one or more uplink wireless communications that span a set of one or more transmission time intervals (TTIs), where the indication is based on one or more types of the one or more uplink wireless communications. The method may further include determining a duration of time for which an uplink pre-compensation is to be applied to the one or more uplink wireless communications, where the duration of time is based on one or more parameters of the uplink communications configuration. The method may further include outputting the one or more uplink wireless communications within the duration of time with the uplink pre-compensation applied.

An apparatus for wireless communication at a UE is described. The apparatus may include a processor and memory coupled with the processor. The processor may be configured to obtain, via broadcast signaling or UE-specific signaling, an indication of an uplink communications configuration for one or more uplink wireless communications that span a set of one or more TTIs, where the indication is based on one or more types of the one or more uplink wireless communications. The processor may be further configured to determine a duration of time for which an uplink pre-compensation is to be applied to the one or more uplink wireless communications, where the duration of time is based on one or more parameters of the uplink communications configuration. The processor may be further configured to output the one or more uplink wireless communications within the duration of time with the uplink pre-compensation applied.

Another apparatus for wireless communication at a UE is described. The apparatus may include means for obtaining, via broadcast signaling or UE-specific signaling, an indication of an uplink communications configuration for one or more uplink wireless communications that span a set of one or more TTIs, where the indication is based on one or more types of the one or more uplink wireless communications. The apparatus may further include means for determining a duration of time for which an uplink pre-compensation is to be applied to the one or more uplink wireless communications, where the duration of time is based on one or more parameters of the uplink communications configuration. The apparatus may further include means for outputting the one or more uplink wireless communications within the duration of time with the uplink pre-compensation applied.

A non-transitory computer-readable medium storing code for wireless communication at a UE is described. The code may include instructions executable by a processor to obtain, via broadcast signaling or UE-specific signaling, an indication of an uplink communications configuration for one or more uplink wireless communications that span a set of one or more TTIs, where the indication is based on one or more types of the one or more uplink wireless communications. The instructions may be further executable by the processor to determine a duration of time for which an uplink pre-compensation is to be applied to the one or more uplink wireless communications, where the duration of time is based on one or more parameters of the uplink communications configuration. The instructions may be further executable by the processor to output the one or more uplink wireless communications within the duration of time with the uplink pre-compensation applied.

In some examples of the method, apparatuses, and non-transitory computer-readable medium described herein, determining the duration of time for which the uplink pre-compensation is to be applied may include operations, features, means, or instructions for determining a type of satellite orbit associated with a satellite to which the UE outputs the one or more uplink wireless communications and operations, features, means, or instructions for determining the duration of time based on the one or more parameters of the uplink communications configuration, where the one or more parameters indicate the type of satellite orbit associated with the satellite.

Some examples of the method, apparatuses, and non-transitory computer-readable medium described herein may further include operations, features, means, or instructions for determining that the type of satellite orbit includes one or more of a geostationary equatorial orbit (GEO) or a low-earth orbit (LEO).

Some examples of the method, apparatuses, and non-transitory computer-readable medium described herein may further include operations, features, means, or instructions for determining the duration of time based on the one or more parameters of the uplink communications configuration, where the one or more parameters indicate that the type of satellite orbit includes one or more of the GEO or the LEO.

In some examples of the method, apparatuses, and non-transitory computer-readable medium described herein, determining the duration of time for which the uplink pre-compensation is to be applied may include operations, features, means, or instructions for determining that frequency hopping is enabled for the one or more uplink wireless communications that span the set of one or more TTIs.

In some examples of the method, apparatuses, and non-transitory computer-readable medium described herein, determining the duration of time for which the uplink pre-compensation is to be applied may include operations, features, means, or instructions for determining a frequency hopping interval for the one or more uplink wireless communications that span the set of one or more TTIs.

In some examples of the method, apparatuses, and non-transitory computer-readable medium described herein, determining the duration of time for which the uplink pre-compensation is to be applied may include operations, features, means, or instructions for determining the duration of time based on the one or more parameters of the uplink communications configuration, where the one or more parameters indicate that the frequency hopping is enabled for the one or more uplink wireless communications and for the frequency hopping interval.

Some examples of the method, apparatuses, and non-transitory computer-readable medium described herein may further include operations, features, means, or instructions for determining a second duration of time for which the uplink pre-compensation is to be applied when the frequency hopping is disabled and determining the duration of time based on whether a time duration of the frequency hopping interval is longer or shorter than the second duration of time.

In some examples of the method, apparatuses, and non-transitory computer-readable medium described herein, the duration of time may be equal to the second duration of time when the time duration of the frequency hopping interval is larger than the second duration of time and the duration of time may be equal to the frequency hopping interval when the time duration of the frequency hopping interval is smaller than the second duration of time.

In some examples of the method, apparatuses, and non-transitory computer-readable medium described herein, the broadcast signaling includes one or more of a system information block (SIB) message or a physical random access channel (PRACH) message and the UE-specific signaling includes one or more dedicated radio resource control (RRC) messages.

In some examples of the method, apparatuses, and non-transitory computer-readable medium described herein, the uplink communications configuration corresponds to a PRACH configuration, the one or more uplink wireless communications correspond to one or more PRACH preambles for contention-based random access, and the PRACH configuration indicates a respective duration of time for which a respective uplink pre-compensation is to be applied to a respective PRACH preamble of the one or more PRACH preambles.

In some examples of the method, apparatuses, and non-transitory computer-readable medium described herein, the respective duration of time for which the respective uplink pre-compensation is to be applied to the respective PRACH preamble of the one or more PRACH preambles may be based on a respective number of repetitions associated with each respective PRACH preamble.

Some examples of the method, apparatuses, and non-transitory computer-readable medium described herein may further include operations, features, means, or instructions for outputting one or both of a request to update the duration of time or a UE assistance information that indicates the duration of time.

In some examples of the method, apparatuses, and non-transitory computer-readable medium described herein, the uplink communications configuration may be applicable to narrowband Internet of Things (IoT) communications, enhanced machine-type communications (eMTC), or NR communications in a non-terrestrial network (NTN).

In some examples of the method, apparatuses, and non-transitory computer-readable medium described herein, determining the duration of time for which the uplink pre-compensation is to be applied may include operations, features, means, or instructions for obtaining a downlink communication from a satellite.

In some examples of the method, apparatuses, and non-transitory computer-readable medium described herein, determining the duration of time for which the uplink pre-compensation is to be applied may include operations, features, means, or instructions for determining whether a communication link from a ground gateway to the satellite is pre-compensated based on the downlink communication.

In some examples of the method, apparatuses, and non-transitory computer-readable medium described herein, determining the duration of time for which the uplink pre-compensation is to be applied may include operations, features, means, or instructions for determining the duration of time based on whether the communication link from the ground gateway to the satellite is pre-compensated.

In some examples of the method, apparatuses, and non-transitory computer-readable medium described herein, the duration of time may be based on whether the communication link from the ground gateway to the satellite is pre-compensated.

In some examples of the method, apparatuses, and non-transitory computer-readable medium described herein, determining the duration of time for which the uplink pre-compensation is to be applied may include operations, features, means, or instructions for determining a mobility characteristic of the UE and operations, features, means, or instructions for determining the duration of time based on the mobility characteristic of the UE.

Some examples of the method, apparatuses, and non-transitory computer-readable medium described herein may further include operations, features, means, or instructions for determining an updated uplink pre-compensation after an expiration of a first instance associated with the duration of time and operations, features, means, or instructions for applying the updated uplink pre-compensation in a second instance associated with the duration of time for which the updated uplink pre-compensation is to be applied to the one or more uplink wireless communications.

In some examples of the method, apparatuses, and non-transitory computer-readable medium described herein, the UE may include an antenna, an antenna panel, or both.

A method for wireless communication at a network entity is described. The method may include outputting, via broadcast signaling or UE-specific signaling, an indication of an uplink communications configuration for one or more uplink wireless communications that span a set of one or more TTIs, where the indication is based on one or more types associated with the one or more uplink wireless communications. The method may further include determining a duration of time for which an uplink pre-compensation is to be applied to the one or more uplink wireless communications, where the duration of time is based on one or more parameters of the uplink communications configuration. The method may further include obtaining the one or more uplink wireless communications within the duration of time with the uplink pre-compensation applied.

An apparatus for wireless communication at a network entity is described. The apparatus may include a processor and memory coupled with the processor. The processor may be configured to output, via broadcast signaling or UE-specific signaling, an indication of an uplink communications configuration for one or more uplink wireless communications that span a set of one or more TTIs, where the indication is based on one or more types associated with the one or more uplink wireless communications. The processor may be further configured to determine a duration of time for which an uplink pre-compensation is to be applied to the one or more uplink wireless communications, where the duration of time is based on one or more parameters of the uplink communications configuration. The processor may be further configured to obtain the one or more uplink wireless communications within the duration of time with the uplink pre-compensation applied.

Another apparatus for wireless communication at a network entity is described. The apparatus may include means for outputting, via broadcast signaling or UE-specific signaling, an indication of an uplink communications configuration for one or more uplink wireless communications that span a set of one or more TTIs, where the indication is based on one or more types associated with the one or more uplink wireless communications. The apparatus may further include means for determining a duration of time for which an uplink pre-compensation is to be applied to the one or more uplink wireless communications, where the duration of time is based on one or more parameters of the uplink communications configuration. The apparatus may further include means for obtaining the one or more uplink wireless communications within the duration of time with the uplink pre-compensation applied.

A non-transitory computer-readable medium storing code for wireless communication at a network entity is described. The code may include instructions executable by a processor to output, via broadcast signaling or UE-specific signaling, an indication of an uplink communications configuration for one or more uplink wireless communications that span a set of one or more TTIs, where the indication is based on one or more types associated with the one or more uplink wireless communications. The instructions may be further executable by the processor to determine a duration of time for which an uplink pre-compensation is to be applied to the one or more uplink wireless communications, where the duration of time is based on one or more parameters of the uplink communications configuration. The instructions may be further executable by the processor to obtain the one or more uplink wireless communications within the duration of time with the uplink pre-compensation applied.

In some examples of the method, apparatuses, and non-transitory computer-readable medium described herein, determining the duration of time for which the uplink pre-compensation is to be applied may include operations, features, means, or instructions for determining a type of satellite orbit associated with the network entity, where the network entity includes a satellite.

In some examples of the method, apparatuses, and non-transitory computer-readable medium described herein, determining the duration of time for which the uplink pre-compensation is to be applied may include operations, features, means, or instructions for determining the duration of time based on the one or more parameters of the uplink communications configuration, where the one or more parameters indicate the type of satellite orbit associated with the satellite.

Some examples of the method, apparatuses, and non-transitory computer-readable medium described herein may further include operations, features, means, or instructions for determining that the type of satellite orbit includes one or more of a GEO or a LEO. Some examples of the method, apparatuses, and non-transitory computer-readable medium described herein may further include operations, features, means, or instructions for determining the duration of time based on the one or more parameters of the uplink communications configuration, where the one or more parameters indicate that the type of satellite orbit includes one or more of the GEO or the LEO.

In some examples of the method, apparatuses, and non-transitory computer-readable medium described herein, a respective duration of time for which the uplink pre-compensation is to be applied for the GEO may be greater than a respective duration of time in which the uplink pre-compensation is to be applied for the LEO.

In some examples of the method, apparatuses, and non-transitory computer-readable medium described herein, determining the duration of time for which the uplink pre-compensation is to be applied may include operations, features, means, or instructions for determining that frequency hopping is enabled for the one or more uplink wireless communications that span the set of one or more TTIs.

In some examples of the method, apparatuses, and non-transitory computer-readable medium described herein, determining the duration of time for which the uplink pre-compensation is to be applied may include operations, features, means, or instructions for determining a frequency hopping interval for the one or more uplink wireless communications that span the set of one or more TTIs.

In some examples of the method, apparatuses, and non-transitory computer-readable medium described herein, determining the duration of time for which the uplink pre-compensation is to be applied may include operations, features, means, or instructions for determining the duration of time based on the one or more parameters of the uplink communications configuration, where the one or more parameters indicate that the frequency hopping is enabled for the one or more uplink wireless communications and for the frequency hopping interval.

Some examples of the method, apparatuses, and non-transitory computer-readable medium described herein may further include operations, features, means, or instructions for determining a second duration of time for which the uplink pre-compensation is to be applied when the frequency hopping is disabled.

Some examples of the method, apparatuses, and non-transitory computer-readable medium described herein may further include operations, features, means, or instructions for determining the duration of time based on whether a time duration of the frequency hopping interval is longer or shorter than the second duration of time.

In some examples of the method, apparatuses, and non-transitory computer-readable medium described herein, the duration of time may be equal to the second duration of time when the time duration of the frequency hopping interval is larger than the second duration of time and the duration of time may be equal to the frequency hopping interval when the time duration of the frequency hopping interval is smaller than the second duration of time.

In some examples of the method, apparatuses, and non-transitory computer-readable medium described herein, the broadcast signaling includes one or more of a SIB message or a PRACH message and the UE-specific signaling includes one or more dedicated RRC messages.

In some examples of the method, apparatuses, and non-transitory computer-readable medium described herein, the uplink communications configuration corresponds to a PRACH configuration, the one or more uplink wireless communications correspond to one or more PRACH preambles for contention-based random access, and the PRACH configuration indicates a respective duration of time for which a respective uplink pre-compensation is to be applied to a respective PRACH preamble of each of the one or more PRACH preambles.

In some examples of the method, apparatuses, and non-transitory computer-readable medium described herein, the respective duration of time for which the respective uplink pre-compensation is to be applied to the respective PRACH preamble of the one or more PRACH preambles may be based on a respective number of repetitions associated with each respective PRACH preamble.

Some examples of the method, apparatuses, and non-transitory computer-readable medium described herein may further include operations, features, means, or instructions for outputting one or more of an RRC message, a medium access control-control element (MAC-CE), or a downlink control information (DCI) that indicates the duration of time.

In some examples of the method, apparatuses, and non-transitory computer-readable medium described herein, the network entity may include an antenna, an antenna panel, or both.

A method for wireless communication at a UE is described. The method may include receiving an indication of an uplink communications configuration that pertains to uplink wireless communications spanning a set of one or more TTIs. The method may further include determining a duration of time during which an uplink pre-compensation is to be applied to an uplink wireless communication, where the duration of time is based on one or more parameters of the uplink communications configuration. The method may further include transmitting the uplink wireless communication using the uplink pre-compensation during the duration of time.

An apparatus for wireless communication at a UE is described. The apparatus may include a processor and memory coupled with the processor. The processor may be configured to receive an indication of an uplink communications configuration that pertains to uplink wireless communications spanning a set of TTIs. The processor may be further configured to determine a duration of time during which an uplink pre-compensation is to be applied to an uplink wireless communication, where the duration of time is based on one or more parameters of the uplink communications configuration. The processor may be further configured to transmit the uplink wireless communication using the uplink pre-compensation during the duration of time.

Another apparatus for wireless communication at a UE is described. The apparatus may include means for receiving an indication of an uplink communications configuration that pertains to uplink wireless communications spanning a set of TTIs. The apparatus may further include means for determining a duration of time during which an uplink pre-compensation is to be applied to an uplink wireless communication, where the duration of time is based on one or more parameters of the uplink communications configuration. The apparatus may further include means for transmitting the uplink wireless communication using the uplink pre-compensation during the duration of time.

A non-transitory computer-readable medium storing code for wireless communication at a UE is described. The code may include instructions executable by a processor to receive an indication of an uplink communications configuration that pertains to uplink wireless communications spanning a set of TTIs. The instructions may be further executable by the processor to determine a duration of time during which an uplink pre-compensation is to be applied to an uplink wireless communication, where the duration of time is based on one or more parameters of the uplink communications configuration. The instructions may be further executable by the processor to transmit the uplink wireless communication using the uplink pre-compensation during the duration of time.

In some examples of the method, apparatuses, and non-transitory computer-readable medium described herein, determining the duration of time during which the uplink pre-compensation is to be applied may include operations, features, means, or instructions for determining a type of satellite orbit associated with a satellite to which the UE transmits the uplink wireless communication and determining the duration of time based on the one or more parameters of the uplink communications configuration indicating the type of satellite orbit associated with the satellite.

Some examples of the method, apparatuses, and non-transitory computer-readable medium described herein may further include operations, features, means, or instructions for determining that the type of satellite orbit includes one or more of a GEO or a LEO and determining the duration of time based on the one or more parameters of the uplink communications configuration indicating that the type of satellite orbit includes one or more of the GEO or the LEO.

In some examples of the method, apparatuses, and non-transitory computer-readable medium described herein, a respective duration of time during which the uplink pre-compensation may be to be applied for the GEO may be greater than a respective duration of time during which the uplink pre-compensation is to be applied for the LEO.

In some examples of the method, apparatuses, and non-transitory computer-readable medium described herein, determining the duration of time during which the uplink pre-compensation is to be applied may include operations, features, means, or instructions for receiving a downlink communication from a satellite, determining whether a communication link from a ground gateway to a satellite is pre-compensated based on the downlink communication, and determining the duration of time based on whether the communication link from the ground gateway to the satellite is pre-compensated.

In some examples of the method, apparatuses, and non-transitory computer-readable medium described herein, the duration of time differs based on whether the communication link from the ground gateway to the satellite is pre-compensated.

In some examples of the method, apparatuses, and non-transitory computer-readable medium described herein, determining the duration of time during which the uplink pre-compensation is to be applied may include operations, features, means, or instructions for determining that frequency hopping is enabled for the uplink wireless communication spanning the set of TTIs, determining a frequency hopping interval for the uplink wireless communication spanning the set of TTIs, and determining the duration of time based on the one or more parameters of the uplink communications configuration indicating that frequency hopping is enabled for the uplink wireless communication and the frequency hopping interval.

Some examples of the method, apparatuses, and non-transitory computer-readable medium described herein may further include operations, features, means, or instructions for determining a second duration of time during which the uplink pre-compensation is to be applied when the frequency hopping is disabled and determining the duration of time based on whether the frequency hopping interval is larger or smaller than the second duration of time.

In some examples of the method, apparatuses, and non-transitory computer-readable medium described herein, the duration of time is equal to the second duration of time based on that the frequency hopping interval is larger than the second duration of time, or the duration of time is equal to the frequency hopping interval based on that the frequency hopping interval is smaller than the second duration of time.

In some examples of the method, apparatuses, and non-transitory computer-readable medium described herein, determining the duration of time during which the uplink pre-compensation is to be applied may include operations, features, means, or instructions for determining a mobility characteristic of the UE and determining the duration of time based on the mobility characteristic of the UE.

In some examples of the method, apparatuses, and non-transitory computer-readable medium described herein, the duration of time differs based on whether the uplink pre-compensation is for mitigation of a propagation delay or a Doppler frequency shift.

In some examples of the method, apparatuses, and non-transitory computer-readable medium described herein, determining the duration of time during which the uplink pre-compensation is to be applied may include operations, features, means, or instructions for receiving one or more of an RRC message, a MAC-CE, or a DCI including an indication of the duration of time.

Some examples of the method, apparatuses, and non-transitory computer-readable medium described herein may further include operations, features, means, or instructions for transmitting a request to update the duration of time or UE assistance information including an indication of the duration of time.

In some examples of the method, apparatuses, and non-transitory computer-readable medium described herein, the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of the one or more PRACH preambles.

In some examples of the method, apparatuses, and non-transitory computer-readable medium described herein, the respective duration of time during which the respective uplink pre-compensation is to be applied to the respective PRACH preamble of the one or more PRACH preambles may be based on a respective number of repetitions associated with each respective PRACH preamble.

Some examples of the method, apparatuses, and non-transitory computer-readable medium described herein may further include operations, features, means, or instructions for determining an updated uplink pre-compensation after an expiration of a first instance associated with the duration of time and applying the updated uplink pre-compensation during a second instance associated with the duration of time in which the updated uplink pre-compensation is to be applied to the uplink wireless communication.

A method for wireless communication at a base station is described. The method may include transmitting an indication of an uplink communications configuration that pertains to uplink wireless communications spanning a set of TTIs. The method may further include determining a duration of time during which an uplink pre-compensation is to be applied to an uplink wireless communication, where the duration of time is based on one or more parameters of the uplink communications configuration. The method may further include receiving the uplink wireless communication using the uplink pre-compensation during the duration of time.

An apparatus for wireless communication at a base station is described. The apparatus may include a processor, and memory coupled with the processor. The processor may be configured to transmit an indication of an uplink communications configuration that pertains to uplink wireless communications spanning a set of TTIs. The processor may be further configured to determine a duration of time during which an uplink pre-compensation is to be applied to an uplink wireless communication, where the duration of time is based on one or more parameters of the uplink communications configuration. The processor may be further configured to receive the uplink wireless communication using the uplink pre-compensation during the duration of time.

Another apparatus for wireless communication at a base station is described. The apparatus may include means for transmitting an indication of an uplink communications configuration that pertains to uplink wireless communications spanning a set of TTIs. The apparatus may further include means for determining a duration of time during which an uplink pre-compensation is to be applied to an uplink wireless communication, where the duration of time is based on one or more parameters of the uplink communications configuration. The apparatus may further include means for receiving the uplink wireless communication using the uplink pre-compensation during the duration of time.

A non-transitory computer-readable medium storing code for wireless communication at a base station is described. The code may include instructions executable by a processor to transmit an indication of an uplink communications configuration that pertains to uplink wireless communications spanning a set of TTIs. The instructions may be further executable by the processor to determine a duration of time during which an uplink pre-compensation is to be applied to an uplink wireless communication, where the duration of time is based on one or more parameters of the uplink communications configuration. The instructions may be further executable by the processor to receive the uplink wireless communication using the uplink pre-compensation during the duration of time.

In some examples of the method, apparatuses, and non-transitory computer-readable medium described herein, determining the duration of time during which the uplink pre-compensation is to be applied may include operations, features, means, or instructions for determining a type of satellite orbit associated with the base station to which the UE transmits the uplink wireless communication, the base station including a satellite and determining the duration of time based on the one or more parameters of the uplink communications configuration indicating the type of satellite orbit associated with the satellite.

Some examples of the method, apparatuses, and non-transitory computer-readable medium described herein may further include operations, features, means, or instructions for determining that the type of satellite orbit includes one or more of a GEO or a LEO and determining the duration of time based on the one or more parameters of the uplink communications configuration indicating that the type of satellite orbit includes one or more of the GEO or the LEO.

In some examples of the method, apparatuses, and non-transitory computer-readable medium described herein, a respective duration of time during which the uplink pre-compensation is to be applied for the GEO may be greater than a respective duration of time during which the uplink pre-compensation is to be applied for the LEO.

In some examples of the method, apparatuses, and non-transitory computer-readable medium described herein, determining the duration of time during which the uplink pre-compensation is to be applied may include operations, features, means, or instructions for determining whether a communication link from a ground gateway to the base station is pre-compensated and determining the duration of time based on whether the communication link from the ground gateway to the base station is pre-compensated.

In some examples of the method, apparatuses, and non-transitory computer-readable medium described herein, the duration of time differs based on whether the communication link from the ground gateway to the base station is pre-compensated.

In some examples of the method, apparatuses, and non-transitory computer-readable medium described herein, determining the duration of time during which the uplink pre-compensation is to be applied may include operations, features, means, or instructions for determining that frequency hopping is enabled for the uplink wireless communication spanning the set of TTIs, determining a frequency hopping interval for the uplink wireless communication spanning the set of TTIs, and determining the duration of time based on the one or more parameters of the uplink communications configuration indicating that frequency hopping is enabled for the uplink wireless communication and the frequency hopping interval.

Some examples of the method, apparatuses, and non-transitory computer-readable medium described herein may further include operations, features, means, or instructions for determining a second duration of time during which the uplink pre-compensation is to be applied when the frequency hopping is disabled and determining the duration of time based on whether the frequency hopping interval is larger or smaller than the second duration of time.

In some examples of the method, apparatuses, and non-transitory computer-readable medium described herein, the duration of time is equal to the second duration of time based on that the frequency hopping interval is larger than the second duration of time, or the duration of time is equal to the frequency hopping interval based on that the frequency hopping interval is smaller than the second duration of time.

In some examples of the method, apparatuses, and non-transitory computer-readable medium described herein, determining the duration of time during which the uplink pre-compensation is to be applied may include operations, features, means, or instructions for determining a mobility characteristic of the UE and determining the duration of time based on the mobility characteristic of the UE.

In some examples of the method, apparatuses, and non-transitory computer-readable medium described herein, the duration of time differs based on whether the uplink pre-compensation is for mitigation of a propagation delay or a Doppler frequency shift.

Some examples of the method, apparatuses, and non-transitory computer-readable medium described herein may further include operations, features, means, or instructions for transmitting one or more of an RRC message, a MAC-CE, or a DCI including an indication of the duration of time.

Some examples of the method, apparatuses, and non-transitory computer-readable medium described herein may further include operations, features, means, or instructions for receiving a request to update the duration of time or UE assistance information including an indication of the duration of time.

In some examples of the method, apparatuses, and non-transitory computer-readable medium described herein, the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of each of the one or more PRACH preambles.

In some examples of the method, apparatuses, and non-transitory computer-readable medium described herein, the respective duration of time during which the respective uplink pre-compensation is to be applied to the respective PRACH preamble of the one or more PRACH preambles may be based on a respective number of repetitions associated with each respective PRACH preamble.

Some examples of the method, apparatuses, and non-transitory computer-readable medium described herein may further include operations, features, means, or instructions for determining an updated uplink pre-compensation after an expiration of a first instance associated with the duration of time and applying the updated uplink pre-compensation during a second instance associated with the duration of time in which the updated uplink pre-compensation is to be applied to the uplink wireless communication.

DETAILED DESCRIPTION

Figure 1:
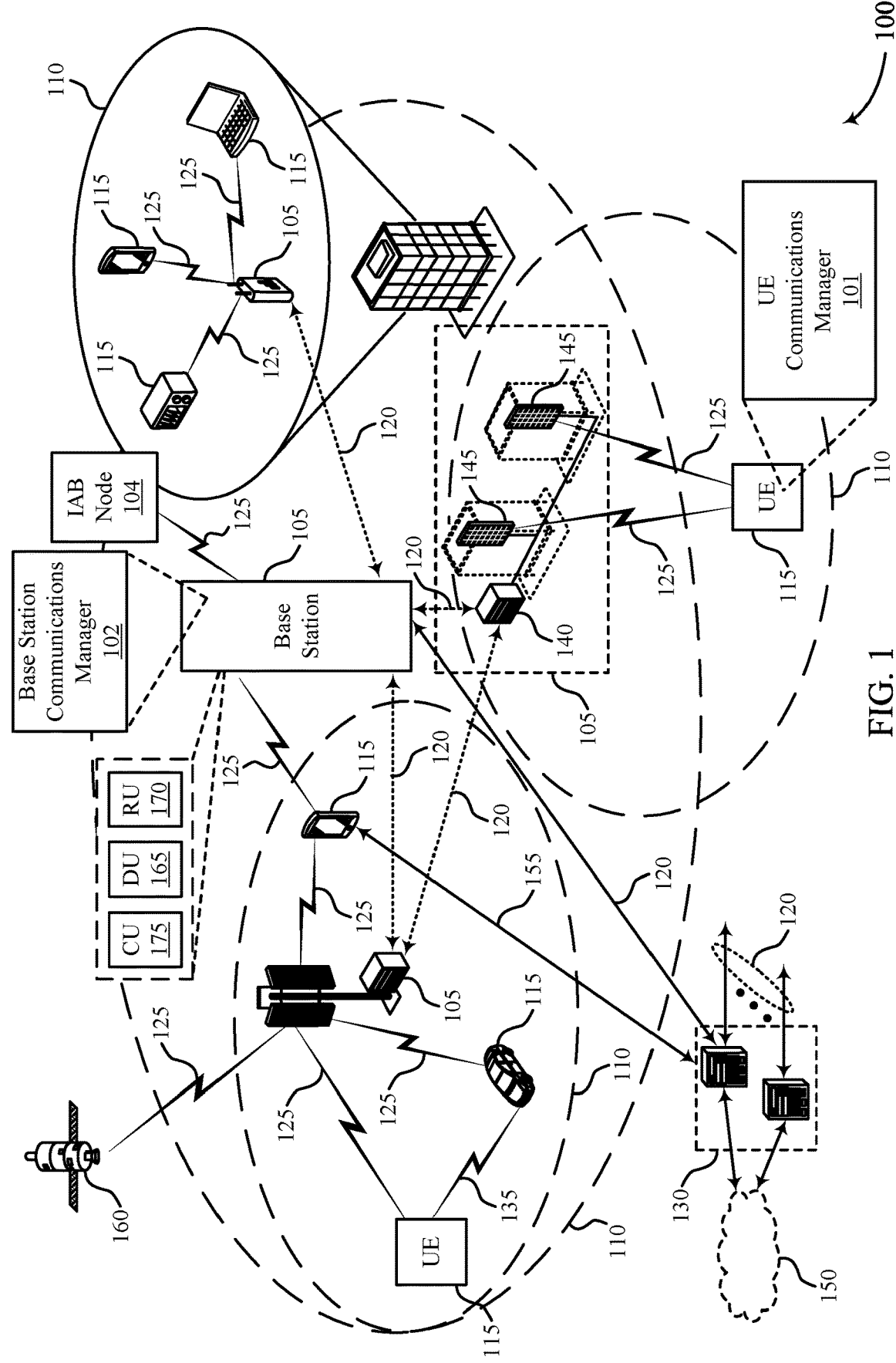
FIGS. 1 and 2 illustrate examples of wireless communications systems that support uplink pre-compensation in accordance with one or more aspects of the present disclosure.

A wireless communications system may include multiple communication devices such as network entities and UEs, which may support multiple radio access technologies including 4G systems (such as LTE systems), 5G systems (such as NR systems), and other future systems and radio access technologies. The wireless communications system may be a terrestrial communications system or a non-terrestrial communications system, or a combination thereof. A non-terrestrial communications system, also referred to as NTN, may be an example of a wireless communications system that includes non-terrestrial communication devices such as satellites, zeppelins, dirigibles, balloons, drones, or unmanned aerial vehicles (UAVs), among other examples. In the example of a non-terrestrial communications system, a satellite in a LEO, a medium-earth orbit (MEO), or a GEO may communicate with the network entities and the UEs in the terrestrial communications system (e.g., at or relatively near ground level).

A satellite may be moving at high-speeds relative to one or more of the network entities or the UEs operating within the terrestrial communications system. Moreover, there may be a relatively large distance between the satellite and one or more of the network entities or the UEs. As a result of these large distances and high relative speed differentials, wireless communications between the satellite and the one or more network entities or UEs may experience propagation delays or Doppler frequency shifts. A propagation delay may refer to a duration of time between when a signal is transmitted from a first communication device (e.g., the satellite) and when the signal is received at a second communication device (e.g., the one or more network entities or UEs). Propagation delays may result from the signal travelling through a wireless medium. A Doppler frequency shift may refer to the difference (e.g., shift) between a first frequency at which the signal is transmitted (e.g., from the first communication device) and a second frequency at which the signal is received (e.g., at the second communication device). A Doppler frequency shift may occur when two communication devices are moving at high velocities with respect to each other.

Propagation delays and Doppler frequency shifts that occur during wireless communications between the satellite (e.g., a non-terrestrial communication device) and the one or more network entities or UEs (e.g., terrestrial communication devices) may reduce the likelihood of successful communications between the satellite and the one or more network entities or UEs. For example, a UE may be unable to successfully receive or decode wireless communications from the satellite if there is a relatively large propagation delay between when the satellite transmits the wireless communications and when the UE receives the wireless communications. Likewise, the satellite may be unable to successfully receive or decode wireless communications from a network entity if the wireless communications arrive at the satellite with a Doppler frequency shift (due to a relative speed differential between the satellite and the network entity).

In accordance with the techniques described herein, a UE may use information associated with a satellite location (e.g., as a satellite traverses its orbit) or the UE's own respective geolocation to accurately pre-compensate uplink communications for the propagation delay or the Doppler frequency shift. These uplink communications (e.g., from the UE to the satellite) may span multiple TTIs. A TTI may be a scheduling unit in a time domain, such as a symbol, a subframe, a slot, or frame. The uplink communications between the UE and the satellite may be examples of long transmissions (e.g., transmissions that span at least two TTIs).

When a UE transmits a message (e.g., signal, transmission, communication) that spans multiple TTIs (e.g., two or more TTIs), and when the message is to be pre-compensated to account for propagation delay or Doppler frequency shift, the UE may determine a duration during which to apply a pre-compensation amount. When the duration expires, the UE may re-evaluate the pre-compensation amount and then apply a different pre-compensation amount for a second instance of the duration. Many factors may be considered in determining a value of the pre-compensation duration.

In some examples, the pre-compensation duration may be based on a type of orbit of the satellite. For example, the pre-compensation duration may be different for a GEO and a LEO due to the GEO having a higher elevation compared to the LEO. In some other examples, the pre-compensation duration may be based on whether a feeder link (e.g., from a ground gateway, such as a network entity to the satellite) is pre-compensated. In other examples, the pre-compensation duration may be based on whether frequency hopping is enabled or disabled for the uplink wireless communication. As described herein, frequency hopping may refer to a communication device (e.g., a UE) switching between different carrier frequencies while transmitting a wireless signal (e.g., the uplink communication). The pre-compensation duration may be based on a mobility characteristic of the UE. The UE may indicate the determined pre-compensation duration to the satellite to facilitate reception (e.g., decoding) of the uplink wireless communication at the satellite. For example, the UE may request an update to the pre-compensation duration or indicate the pre-compensation duration as UE assistance information. Additionally or alternatively, one or more of the network entities or the satellite may indicate the pre-compensation duration to the UE via control signaling (e.g., an RRC message, a MAC-CE, or a DCI).

In some examples, the UE may receive broadcast signaling (such as a system information block (SIB) or a PRACH message) or UE-specific signaling (such as a dedicated RRC message) indicating an uplink communications configuration for the UE that is applicable to uplink wireless communications spanning a set of one or more TTIs. Accordingly, the UE may determine a pre-compensation duration for the uplink wireless communications based on the uplink communications configuration (which may be indicated via broadcast signaling or UE-specific signaling). As described herein, broadcast signaling may refer to signals (e.g., messages, wireless communications) that are intended for multiple recipient devices, whereas UE-specific signaling may refer to signals that are intended for the UE.

The indication of the uplink communications configuration may, in some examples, depend on a type of the uplink wireless communications. As described herein, the type of the uplink wireless communications may refer to a wireless channel over which the uplink wireless communications are transmitted or information that is included in the uplink wireless communications. For example, the uplink wireless communications may be or may include random access messages transmitted via a PRACH, uplink data messages transmitted via a physical uplink shared channel (PUSCH), or uplink control messages transmitted via a physical uplink control channel (PUCCH), among other examples.

As described herein, communication of information (e.g., any information, signal, or the like) may be described in various aspects using different terminology. Disclosure of one communication term includes disclosure of other communication terms. For example, a first network node (also referred to herein as network entity) may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The techniques described herein may enable a terrestrial communication device (e.g., a UE) and a non-terrestrial communication device (e.g., a satellite) to perform wireless communications with reduced power consumption and greater communication reliability. For example, the described techniques may enable the terrestrial communication device to pre-compensate uplink communications intended for the non-terrestrial communication device (e.g., to account for Doppler frequency shifts or propagation delays), which may increase the likelihood of the non-terrestrial communication device successfully receiving the uplink communications from the terrestrial communication device. As a result, the terrestrial communication device may retransmit the uplink communications fewer times, which may reduce power consumption at the terrestrial communication device.

Aspects of the disclosure are initially described in the context of wireless communications systems. Aspects of the disclosure are further illustrated by and described with reference to apparatus diagrams, system diagrams, and flowcharts that relate to uplink pre-compensation in wireless communications systems.

FIG. 1 illustrates an example of a wireless communications system 100 that supports uplink pre-compensation in wireless communications systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a STA, a remote device, a handheld device, or a subscriber device, or some other suitable terminology, where the "device" may also be referred to as a unit, a station, a terminal, or a client (e.g., a Wi-Fi client), among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). The communication link 135 may also be referred to as a sidelink between at least two UEs 115. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 or FR2 into mid-band frequencies, or both. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to affect link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may affect throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 175, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 175, the DU 165, and the RU 170. The split of functionality between the CU 175, DU 165, and RU 170 is flexible and as such gives rise to numerous permutations of different functionalities depending upon which functions (e.g., MAC functions, baseband functions, radio frequency functions, and any combinations thereof) are performed at the CU 175, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 175, DUs 165, and RUs 170 and may be referred to as donor base stations 105 or IAB donors. One or more DUs 165 (e.g., and/or RUs 170) associated with a donor base station 105 may be partially controlled by CUs 175 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 175 and at least one DU 165 (e.g., and RU 170), where the CU 175 may communicate with the core network 130 over an NG interface (e.g., some backhaul link). The CU 175 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 175. The DU 165 may support one or multiple different cells. IAB donor and IAB nodes 104 may communicate over an F1 interface according to some protocol that defines signaling messages (e.g., F1 AP protocol). Additionally, CU 175 may communicate with the core network over an NG interface (which may be an example of a portion of backhaul link), and may communicate with other CUs 175 (e.g., a CU 175 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 175 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 175 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

The wireless communications system 100 may be a terrestrial communications system or a non-terrestrial communications system, or a combination thereof. For example, the wireless communications system 100 may include one or more of base stations 105, UEs 115, and satellites 160. A satellite 160 may communicate with the base stations 105 (also referred to as gateways in non-terrestrial networks) and the UEs 115. The satellite 160 may be any suitable type of communication satellite configured to communicate with one or more the base stations 105 or the UEs 115 in the wireless communications system 100.

A satellite 160 may be configured to provide wireless communication service in a predefined geographical service area 110. The satellite 160 may be any distance away from the surface of the earth. In some examples, the satellite 160 may be in one or more of a GEO, such as a LEO, a MEO, or a GEO. A GEO may be a circular and equatorial orbit around earth at an altitude, for example, of 35,786 km. The orbital period of the GEO may be equal to the earth rotation period. A MEO may be a circular orbit around earth at an altitude, for example, between from 7,000 to 25,000 km. a LEO may be a circular orbit around earth and at an altitude, for example, between 300 to 1,500 km.

In the example of a non-terrestrial communications system, a satellite 160 may be moving at high-speeds relative to one or more of the base stations 105 or the UEs 115 operating within a terrestrial communications system (for example, at or relatively near ground level). As a result, there may be a large distance between the satellite 160 and one or more of the base stations 105 or the UEs 115. Because of the large distance, there may be a long propagation delay or a Doppler frequency shift for wireless communication between the satellite 160 one or more of the base stations 105 or the UEs 115. One or more of the base stations 105 or the UEs 115 may pre-compensate the wireless communication to mitigate at least one of the propagation delay or the Doppler frequency shift.

The UEs 115 may receive satellite information from one or more of the base stations 105 or a respective satellite 160 in wireless communication with the base stations 105, to pre-compensate a propagation delay or a Doppler frequency shift for uplink wireless communication from the UEs 115 to the respective satellite 160. For example, the UEs 115 may receive the satellite information from the respective satellite 160 as the satellite 160 traverses its orbit (e.g., one or more of a LEO or a GEO). The satellite information may indicate a satellite location with respect to its orbit. The UEs 115 may pre-compensate at least one of a propagation delay or a Doppler frequency shift for uplink wireless communication from the UEs 115 to the respective satellite 160 based on the satellite location. Additionally or alternatively, the UEs 115 may pre-compensate at least one of a propagation delay or a Doppler frequency shift for uplink wireless communication from the UEs 115 to the respective satellite 160 based on the UEs 115 location.

In the wireless communications system 100, some wireless communications between a satellite 160 and one or more of the base stations 105 or the UEs 115 may span multiple TTIs. For example, an uplink transmission from a UE 115 to a satellite 160 may span multiple slots. The UE 115 may aggregate multiple slots for the uplink transmission to the satellite 160. In some other examples, some wireless communications between a satellite 160 and one or more of the base stations 105 or the UEs 115 may repeat and thereby span multiple TTIs. For example, an uplink transmission with multiple repetitions may include eMTC transmissions or narrowband internet-of-things (NB-IoT) transmissions.

In some cases, a UE 115 may apply pre-compensation to wireless communication (e.g., downlink wireless communication, uplink wireless communication) during a pre-compensation duration N, which may span one or more of a symbol duration, a slot duration, a subframe duration, or a frame duration. In some examples, a UE 115 may pre-compensate per N time units for a long PUSCH transmission. The pre-compensation applied to the wireless communication (e.g., a PUSCH transmission) may not vary during the block of N time units. In some other examples, a UE 115 may pre-compensate per N time units for a long PRACH transmission. Likewise, the pre-compensation applied to the PRACH transmission may not vary during the block of N time units. For a respective satellite 160 that has a relative motion with respect to the earth (e.g., a LEO, a MEO) using a same pre-compensation duration for an extended duration may result in low uplink synchronization or interference for uplink wireless communications when supporting multi-TTI uplink communications. Various aspects of the described techniques relate to the UEs 115 pre-compensating at least one of a propagation delay or a Doppler frequency shift for uplink wireless communication spanning multiple TTIs.

A UE 115 may include a communications manager 101 that may support uplink wireless communication in accordance with examples as disclosed herein. The communications manager 101 may be an example of aspects of a communications manager described with reference to FIGS. 5 through 8. For example, the communications manager 101 may receive an uplink communications configuration that pertains to uplink wireless communications spanning a set of TTIs. A set of TTIs may include two or more TTIs. The communications manager 101 may determine a duration of time (also referred to as a pre-compensation duration N) during which an uplink pre-compensation is to be applied to an uplink wireless communication. The duration of time may be based on one or more parameters of the uplink communications configuration. The communications manager 101 may pre-compensate the uplink wireless communication during the duration of time.

One or more of a base station 105 or a satellite 160 may include a communications manager 102 that supports wireless communication in accordance with examples disclosed herein. In some examples, a base station 105 may be part of a satellite 160. The communications manager 102 may be an example of aspects of a communications manager described with reference to FIGS. 9 through 12. For example, the communications manager 102 may transmit an uplink communications configuration that pertains to uplink wireless communications spanning set of TTIs. The communications manager 102 may determine a duration of time for which uplink pre-compensation is to be applied to an uplink wireless communication. The duration of time may be based on one or more parameters of the uplink communications configuration. The communications manager 102 may receive the uplink wireless communication during the duration of time with the pre-compensation applied.

The wireless communications system 100 may provide power saving to the UEs 115, and may promote higher reliability and lower latency uplink wireless communication by the UEs 115. For example, the UEs 115 may increase battery life by pre-compensating uplink communications for at least one of a propagation delay or a Doppler frequency shift. Additionally, the UEs 115 may perform uplink wireless communications with higher communication reliability by pre-compensating the uplink wireless communications to account for at least one of a propagation delay or a Doppler frequency shift.

Figure 2:
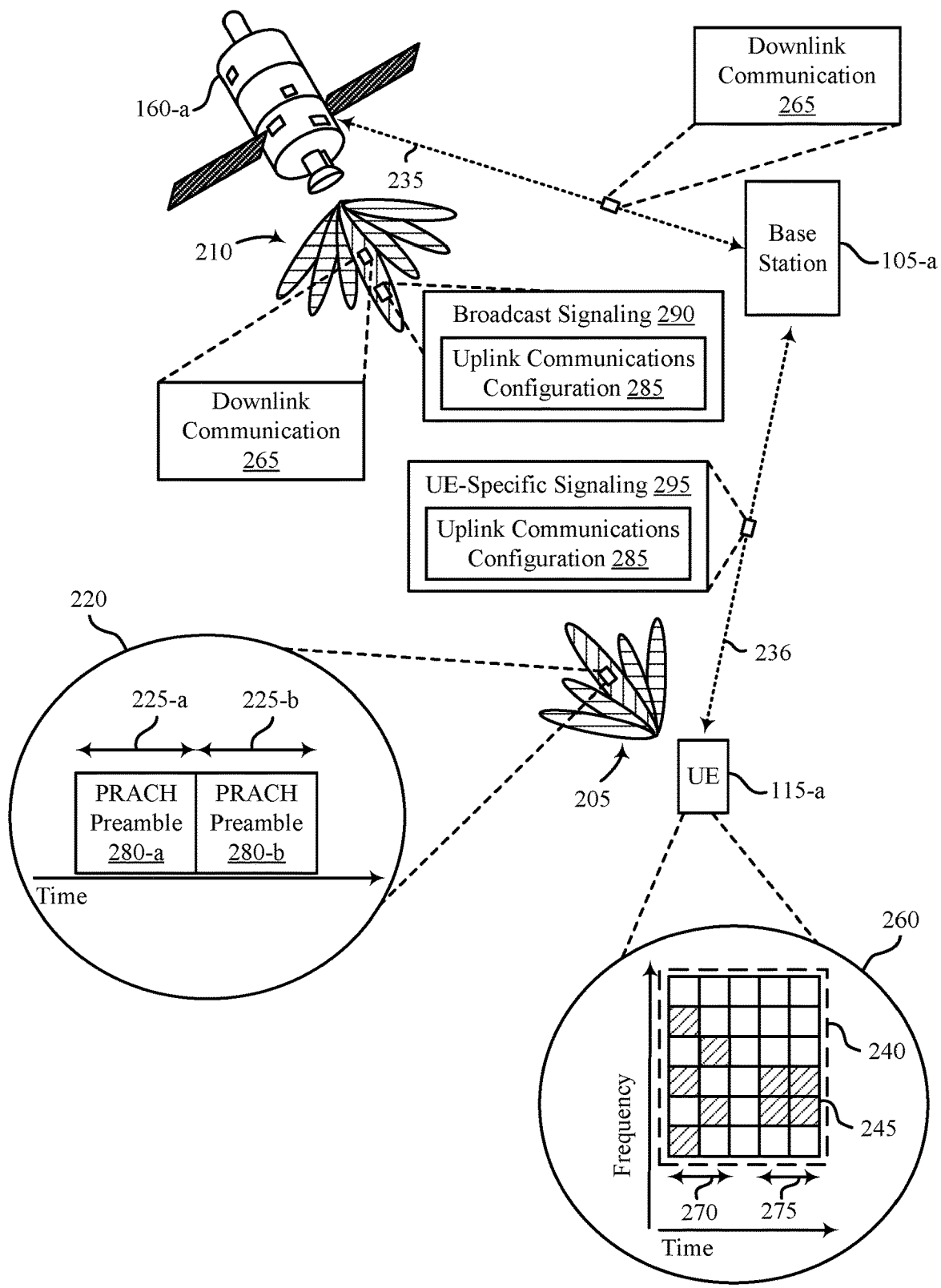

FIG. 2 illustrates an example of a wireless communications system 200 that supports uplink pre-compensation in wireless communications systems in accordance with one or more aspects of the present disclosure. In some examples, the wireless communications system 200 may implement aspects of the wireless communications system 100 or may be implemented by aspects of the wireless communications system 100. For example, the wireless communications system 200 may include a base station 105-a (e.g., a network entity), a UE 115-a, and a satellite 160-a, which may be examples of corresponding devices described herein with reference to FIG. 1. The wireless communications system 200 may support multiple radio access technologies. The wireless communications system 200 may provide power saving and, in some examples, may promote higher reliability and lower latency wireless communications.

One or more of the base station 105-a, the UE 115-a, or the satellite 160-a may be configured with multiple antennas, which may be used for beamformed communications in the wireless communications system 200. The antennas of one or more of the base station 105-a, the UE 115-a, or the satellite 160-a may be located within one or more antenna arrays or antenna panels, which may support beamformed communications. One or more of the base station 105-a, the UE 115-a, or the satellite 160-a may be configured with an antenna array including a number of rows and columns of antenna ports that one or more of the base station 105-a, the UE 115-a, or the satellite 160-a can use to perform beamformed communications in the wireless communications system 200.

The UE 115-a may perform beamformed communications with one or more of the base station 105-a or the satellite 160-a over one or more respective beams in a set of beams 205. For example, the UE 115-a may perform beamformed communications with the satellite 160-a over one or more respective beams in the set of beams 205 using one or more antennas or antenna panels. In some examples, the satellite 160-a may relay beamformed communications from the UE 115-a to the base station 105-a (e.g., a ground station) over a feeder communication link 235. The base station 105-a may perform beamformed communications with the UE 115-a via the satellite 160-a. For example, the satellite 160-a may relay beamformed communications from the base station 105-a (e.g., a ground station) received over the feeder communication link 235 to the UE 115-a over one or more respective beams in the set of beams 210 using one or more antennas or antenna panels.

In the example of FIG. 2, the UE 115-a may be configured to pre-compensate an uplink communication 220 that includes a PRACH preamble 280-a (e.g., a first PRACH preamble) and a PRACH preamble 280-b (e.g., a second PRACH preamble). In some examples, the PRACH preamble 280-a and the PRACH preamble 280-b may include different PRACH sequences. In other examples, the PRACH preamble 280-a and the PRACH preamble 280-b may include repetitions of the same PRACH sequence. The UE 115-a may determine a pre-compensation duration 225-a for the PRACH preamble 280-a based on one or more parameters indicated by an uplink communications configuration 285. Likewise, the UE 115-a may determine a pre-compensation duration 225-b for the PRACH preamble 280-b based on one or more parameters indicated by the uplink communications configuration 285. In some examples, the pre-compensation duration 225-a may depend on a respective number of repetitions associated with the PRACH preamble 280-a.

The UE 115-a may be configured to pre-compensate the uplink communication 220 for at least one of a propagation delay or a Doppler frequency shift during one or both of the pre-compensation duration 225-a or the pre-compensation duration 225-b. The pre-compensation duration 225-a and the pre-compensation duration 225-b may each span one or more time resources (e.g., symbols, slots, subframes, or frames), which may collectively be referred to as a TTI. In some examples, the UE 115-a may be configured to apply uplink pre-compensation to the uplink communication 220 during the pre-compensation duration 225-a and the pre-compensation duration 225-b.

In some examples, if the uplink communication 220 is a long uplink communication (e.g., an uplink communication spanning at least two TTIs), the UE 115-a may update (e.g., adjust) the uplink pre-compensation prior to each pre-compensation duration. For example, after the pre-compensation duration 225-a, the UE 115-a may determine (e.g., re-evaluate, calculate) an appropriate uplink pre-compensation to apply to the uplink communication 220 during the pre-compensation duration 225-b. As such, when the UE 115-a transmits a long uplink transmission, the UE 115-a may periodically re-evaluate or adjust uplink pre-compensation for the long transmission after each pre-compensation duration.

The UE 115-a may receive an indication of an uplink communications configuration 285 from one or both of the base station 105-a or the satellite 160-a. The uplink communications configuration 285 may be applicable to uplink communications spanning a set of one or more TTIs (e.g., long uplink transmissions). The UE 115-a may receive the indication of the uplink communications configuration 285 via broadcast signaling 290 (e.g., a SIB) or UE-specific signaling 295 (e.g., dedicated RRC signaling). In the example of FIG. 2, the UE 115-a receives broadcast signaling 290 from the satellite 160-*a* and UE-specific signaling 295 from the base station 105-*a*. However, it is to be understood that the UE may also receive broadcast signaling 290 from the base station 105-*a* or UE-specific signaling 295 from the satellite 160-*a*.

If, for example, the uplink communication 220 spans multiple TTIs, the UE 115-*a* may determine the pre-compensation duration 225-*a* or the pre-compensation duration 225-*b* based on one or more parameters indicated by the uplink communications configuration 285. In some cases, these pre-compensation durations may be invariant, or may depend on various criteria. For example, the UE 115-*a* determine different pre-compensation durations for different uplink transmissions (e.g., uplink signals). In some examples, a pre-compensation duration for the uplink communication 220 may depend on a type of satellite orbit (e.g., GEO, LEO, MEO) associated with the satellite 160-*a*.

As described herein, the UE 115-*a* may determine the pre-compensation duration 225-*a* and the pre-compensation duration 225-*b* (during which uplink pre-compensation is to be applied to the uplink communication 220) based on a type of satellite orbit associated with the satellite 160-*a*. In some examples, the UE 115-*a* may determine that the type of satellite orbit is one or more of a GEO or a LEO. The UE 115-*a* may determine one or both of the pre-compensation duration 225-*a* or the pre-compensation duration 225-*b* based on one or more parameters in the uplink communications configuration 285 indicating that the type of satellite orbit includes one or more of the GEO or the LEO. The UE 115-*a* may receive an indication of the uplink communications configuration 285 via broadcast signaling 290 or UE-specific signaling 295. The UE 115-*a* may receive an indication of the uplink communications configuration 285 from one or both of the satellite 160-*a* or the base station 105-*a*. For example, the UE 115-*a* may receive the indication of the uplink communications configuration 285 via a communication link 236 between the UE 115-*a* and the base station 105-*a*. Additionally or alternatively, the UE 115-*a* may receive the indication of the uplink communications configuration 285 from the satellite 160-*a* via the set of beams 210.

For a GEO satellite, a duration of the pre-compensation duration 225-*a* or the pre-compensation duration 225-*b* may be relatively long (e.g., above a threshold). For example, the pre-compensation duration 225-*a* may be longer than an effective duration of the uplink communication 220. Alternatively, the pre-compensation duration 225-*a* or the pre-compensation duration 225-*b* may be equal to a duration of the uplink communication 220. In some examples, the pre-compensation duration 225-*b* for a LEO satellite may be smaller than the pre-compensation duration 225-*b* for a GEO satellite.

The wireless communications system 200 may include a first downlink signaling path from the base station 105-*a* to the satellite 160-*a* and a second downlink signaling path from the satellite 160-*a* to the UE 115-*a*. The wireless communications system 200 may also include a first uplink signaling path from the UE 115-*a* to the satellite 160-*a* and a second uplink signaling path from the satellite 160-*a* to the base station 105-*a*. The pre-compensation duration 225-*a* or the pre-compensation duration 225-*b* may, in some examples, be dependent on whether the feeder communication link 235 is pre-compensated by the base station 105-*a*. That is, the pre-compensation duration 225-*a* or the pre-compensation duration 225-*b* may be a function of whether the feeder communication link 235 from a ground gateway (such as the base station 105-*a*) to the satellite 160-*a* is pre-compensated. In some examples, if the feeder communication link 235 is pre-compensated by the base station 105-*a*, the residual time or frequency offset at the UE 115-*a* for the uplink communication 220 may be lower, which may result in a relatively longer pre-compensation duration.

By way of example, the UE 115-*a* may receive a downlink communication 265 from the satellite 160-*a*. The downlink communication 265 may originate at the base station 105-*a*. That is, the base station 105-*a* may transmit the downlink communication 265 to the satellite 160-*a*, and the satellite 160-*a* may relay the downlink communication 265 to the UE 115-*a*. The UE 115-*a* may use the downlink communication 265 as a reference to determine timing information with respect to the satellite 160-*a* (e.g., a non-terrestrial network cell). The UE 115-*a* may also use satellite ephemeris and global navigation satellite system (GNSS) for positioning. In some cases, the base station 105-*a* may pre-compensate the downlink communication 265 from the base station 105-*a* to the UE 115-*a* via the satellite 160-*a*. In some other cases, if the feeder communication link 235 is not pre-compensated, the downlink communication 265 itself may include additional time or frequency offsets (e.g., shifts). As such, if the UE 115-*a* uses such a downlink communication from the satellite 160-*a* as a reference, the UE 115-*a* may re-evaluate uplink pre-compensation more frequently because the initial reference signal may introduce errors.

The pre-compensation duration 225-*a* or the pre-compensation duration 225-*b* may, in some examples, depend on whether frequency hopping is enabled or disabled for the uplink communication 220. In the example of FIG. 2, a resource grid 260 illustrates resource elements 240 (which may be allocated for other purposes) and uplink resource elements 245 for the uplink communication 220. One or more of the resource elements 240 or the uplink resource elements 245 may include time and frequency resources, which may include symbol durations, slot durations, subcarriers, carriers or a combination thereof. The UE 115-*a* may determine that frequency hopping is enabled for the uplink communication 220 that spans a set of TTIs (e.g., slot durations). With reference to the resource grid 260, the UE 115-*a* may be configured to transmit the uplink communication 220 by changing a subcarrier or a carrier (e.g., across different frequencies) over each respective symbol duration or slot duration of a set of symbol durations or a set of slot durations. Otherwise, the UE 115-*a* may determine that frequency hopping is disabled for the uplink communication 220 that spans a set of TTIs (e.g., multiple slot durations). If frequency hopping is disabled, with reference to the resource grid 260, the UE 115-*a* may be configured to transmit the uplink communication 220 without changing a subcarrier or a carrier (e.g., across different frequencies) over each respective symbol duration or slot duration of a set of symbol durations or a set of slot durations.

In some examples, the UE 115-*a* may be configured with one pre-compensation duration 270 (referred to as $D_{hopped}$) when frequency hopping is enabled and another pre-compensation duration 275 (referred to as $D_{non-hopped}$) when frequency hopping is disabled. When frequency hopping is enabled, there is also a frequency hopping interval (referred to as H). That is, if the frequency hopping is enabled, the UE 115-*a* may also determine a frequency hopping interval H for the uplink communication 220 that spans the set of TTIs (e.g., multiple slot durations). The UE 115-*a* may determine the pre-compensation duration 225-*a* or the pre-compensation duration 225-*b* based on the one or more parameters of the uplink communications configuration 285 indicating that the frequency hopping is enabled for the uplink communication 220 and the frequency hopping interval. In some examples, when the H<$D_{non-hopped}$, $D_{hopped}$=H. Otherwise, $D_{hopped}$=$D_{non-hopped}$.

Additionally or alternatively, the UE 115-a may determine the pre-compensation duration 225-a or the pre-compensation duration 225-b for the uplink communication 220 based on a mobility characteristic of the UE 115-a. For example, the UE 115-a may determine the pre-compensation duration 225-b based on whether the UE 115-a is stationary or mobile. Mobility of the UE 115-a may affect the current location of the UE 115-a within the wireless communications system 200. As such, the UE 115-a may determine the pre-compensation duration 225-a or the pre-compensation duration 225-b based on a speed of the UE 115-a (when the UE 115-a is mobile).

One or both of the pre-compensation duration 225-a or the pre-compensation duration 225-b may depend on whether the UE 115-a intends to pre-compensate the uplink communication 220 for a propagation delay or a Doppler frequency shift. In other words, the UE 115-a may use a first pre-compensation duration to account for propagation delay, and may use a second (e.g., different) pre-compensation duration to account for Doppler frequency shift. For example, the pre-compensation duration 225-a may have a first length if the UE 115-a is compensating the uplink communication 220 for propagation delay, and may have a second (e.g., different) length if the UE 115-a is compensating the uplink communication 220 for Doppler frequency shift. The first length may be greater than or less than the second length. To mitigate propagation delay, the pre-compensation duration 225-a or the pre-compensation duration 225-b may be configured by one or more of the base station 105-a, the UE 115-a, or the satellite 160-a. To mitigate Doppler frequency shift, the pre-compensation duration 225-a or the pre-compensation duration 225-b may be determined by the UE 115-a.

In the wireless communications system 200, one or more of the base station 105-a, the UE 115-a, or the satellite 160-a may exchange information to enable one or more of the base station 105-a, the UE 115-a, or the satellite 160-a to identify the pre-compensation duration 225-a or the pre-compensation duration 225-b. To facilitate reception and decoding of the uplink communication 220 at the one or more of the base station 105-a or the satellite 160-a, one or more of the base station 105-a, the UE 115-a, or the satellite 160-a may exchange information that indicates the pre-compensation duration 225-a or the pre-compensation duration 225-b for the uplink communication 220. For example, one or both of the base station 105-a or the satellite 160-a may transmit an RRC message, a MAC-CE, or a DCI that indicates the pre-compensation duration 225-a or the pre-compensation duration 225-b. In some examples, the UE 115-a may transmit a request (e.g., via a MAC-CE) to update the pre-compensation duration 225-a or the pre-compensation duration 225-b. Alternatively, the UE 115-a may transmit UE assistance information that indicates the pre-compensation duration 225-a or the pre-compensation duration 225-b.

The UE 115-a may perform a contention-based random access procedure to support wireless communications (e.g., uplink wireless communications, downlink wireless communications) between the UE 115-a and one or more of the base station 105-a or the satellite 160-a. As part of the contention-based random access procedure, one or more of the base station 105-a, the UE 115-a, or the satellite 160-a may exchange one or more random access messages (e.g., handshake messages). An example random access message may include a random access preamble or a sequence that carries information such as a UE identifier. The preamble may indicate (to one or more of the base station 105-a or the satellite 160-a) an attempt to perform a random access procedure, and may enable one or more of the base station 105-a or the satellite 160-a to determine a delay (e.g., a timing delay) between the UE 115-a and one or more of the base station 105-a or the satellite 160-a. The UE 115-a may transmit the preamble to one or more of the base station 105-a or the satellite 160-a on a PRACH, for example. The preamble may be an example of a PRACH preamble. In the example of FIG. 2, the uplink communication 220 may include a PRACH preamble 280-a and a PRACH preamble 280-b.

In some examples, the UE 115-a may receive system information (e.g., a SIB) from one or more of the base station 105-a or the satellite 160-a, which may indicate one or more PRACH preambles. The UE 115-a may select one of these PRACH preambles based on a criterion (e.g., coverage level of the UE 115-a) to commence the contention-based random access procedure. For each of one or more PRACH preambles used by the UE 115-a, there may be a corresponding pre-compensation duration during which the same uplink pre-compensation can be applied. That is, different PRACH preambles may have different uplink pre-compensation durations. The UE 115-a may, in some cases, refrain from applying uplink pre-compensation to PRACH preambles with a number of repetitions below a threshold. For PRACH preambles with a number of repetitions above the threshold, some PRACH preambles may be configured with a relatively shorter uplink pre-compensation duration (e.g., when the UE 115-a is moving at high-speeds), while other PRACH preambles may be configured with a relatively longer uplink pre-compensation duration (e.g., when the UE 115-a is stationary).

The UE 115-a may support dynamic uplink pre-compensation in different pre-compensation durations. One or more of the base station 105-a, the UE 115-a, or the satellite 160-a may determine an updated uplink pre-compensation for the uplink communication 220 after the pre-compensation duration 225-a, and may apply the updated uplink pre-compensation during the pre-compensation duration 225-b.

The wireless communications system 200 may provide power saving to the UE 115-a, and may promote higher reliability and lower latency uplink wireless communication by the UE 115-a. For example, the UE 115-a may increase battery life by pre-compensating the uplink communication 220 (e.g., a long transmission that spans two or more TTIs) for at least one of a propagation delay or a Doppler frequency shift. Additionally, the UE 115-a may promote higher reliability uplink wireless communications by pre-compensating the uplink communication 220 for at least one of a propagation delay or a Doppler frequency shift.

Figure 3:
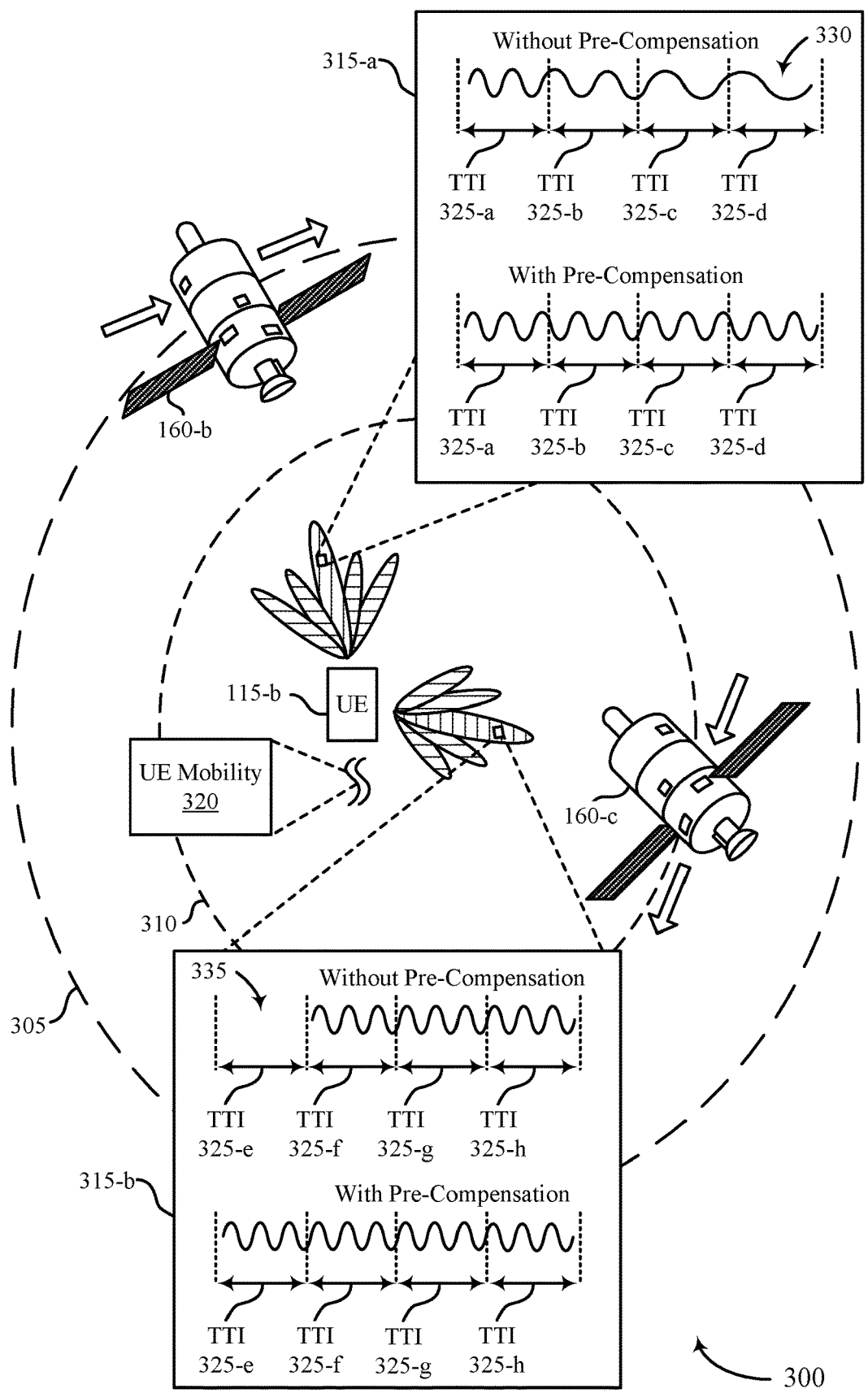
FIG. 3 illustrates an example of a satellite orbit configuration that supports uplink pre-compensation in wireless communications systems in accordance with one or more aspects of the present disclosure.

FIG. 3 illustrates an example of a satellite orbit configuration 300 that supports uplink pre-compensation in wireless communications systems in accordance with one or more aspects of the present disclosure. The satellite orbit configuration 300 may implement aspects of the wireless communications systems 100 and 200, or may be implemented by aspects of the wireless communications systems 100 and 200, as described with reference to FIGS. 1 and 2, respectively. The satellite orbit configuration 300 may include a satellite 160-b associated with a satellite orbit 305, which may be an example of a GEO. The satellite orbit configuration 300 may also include a satellite 160-c associated with a satellite orbit 310, which may be an example of a MEO or a LEO.

The UE 115-b may transmit an uplink communication 315-a to the satellite 160-b. The uplink communication 315-a may span a TTI 325-a, a TTI 325-b, a TTI 325-c, and a TTI 325-d. In some examples, the UE 115-b may pre-compensate the uplink communication 315-a to account for a Doppler frequency shift 330 caused by a relative speed differential between the UE 115-b and the satellite 160-b. For example, the UE 115-b may adjust (e.g., increase or decrease) a frequency of the uplink communication 315-a to compensate for the Doppler frequency shift 330. The UE 115-b may determine an uplink pre-compensation duration for the uplink communication 315-a (e.g., a period of time for which to apply pre-compensation) based on a type of satellite orbit associated with the satellite 160-b.

In some examples, the UE 115-b may determine that the type of satellite orbit associated with the satellite 160-b is a GEO. Accordingly, the UE 115-b may determine a pre-compensation duration for the uplink communication 315-a based on one or more parameters of an uplink communications configuration (e.g., the uplink communications configuration 285 described with reference to FIG. 2) that correspond to a GEO type. In the example of FIG. 3, the pre-compensation duration for the uplink communication 315-a may include the TTI 325-a and the TTI 325-b. As such, the UE 115-b may pre-compensate the uplink communication 315-a (by adjusting the frequency of the uplink communication 315-a) during the TTI 325-a and the TTI 325-b.

Additionally or alternatively, the UE 115-b may transmit an uplink communication 315-b to the satellite 160-c. The uplink communication 315-b may span a TTI 325-f, a TTI 325-g, and a TTI 325-h. In some examples, the UE 115-b may pre-compensate the uplink communication 315-b to account for a propagation delay 335 between the UE 115-b and the satellite 160-c. For example, the UE 115-b may apply a timing advance to the uplink communication 315-b to compensate for the propagation delay 335. The UE 115-b may determine an uplink pre-compensation duration for the uplink communication 315-b (e.g., a period of time for which to apply pre-compensation) based on a type of satellite orbit associated with the satellite 160-c.

In some examples, the UE 115-b may determine that the satellite 160-c is associated with a MEO or LEO. Accordingly, the UE 115-b may determine a pre-compensation duration for the uplink communication 315-b based on one or more parameters of an uplink communications configuration (e.g., the uplink communications configuration 285 described with reference to FIG. 2) that correspond to a LEO or MEO type. In the example of FIG. 3, the pre-compensation duration for the uplink communication 315-b may include a TTI 325-e. As such, the UE 115-b may pre-compensate the uplink communication 315-b (by applying a timing advance to the uplink communication 315-b) during the TTI 325-e.

In some other examples, the UE 115-b may determine a UE mobility 320 associated with the UE 115-b. For example, the UE 115-b may determine whether the UE 115-b is stationary (e.g., at a fixed geolocation) or mobile. The UE 115-b may determine an uplink pre-compensation duration for the uplink communication 315-a or the uplink communication 315-b based on the UE mobility 320. In some examples, if the UE 115-b is mobile, the UE 115-b may determine the uplink pre-compensation duration based on a speed of the UE 115-b. One or more of the satellite 160-b or the satellite 160-c may determine the UE mobility 320 associated with the UE 115-b. One or more of the satellite 160-b or the satellite 160-c may determine an uplink pre-compensation duration based on the UE mobility 320. For example, one or more of the satellite 160-b or the satellite 160-c may determine an uplink pre-compensation duration based on a speed of the UE 115-b (if the UE 115-b is mobile).

Figure 4:
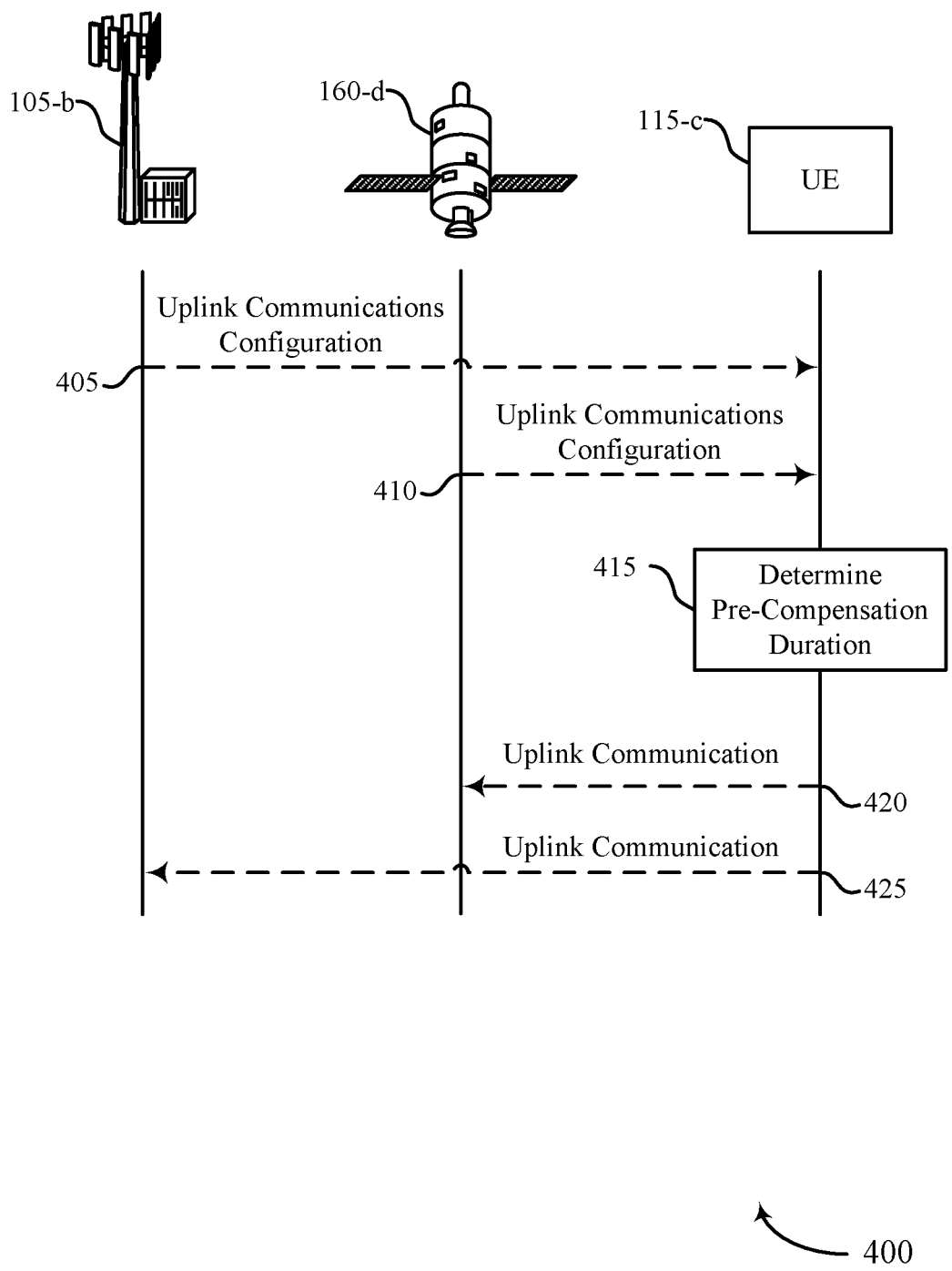
FIG. 4 illustrates an example of a process flow that supports uplink pre-compensation in wireless communications systems in accordance with one or more aspects of the present disclosure.

FIG. 4 illustrates an example of a process flow 400 that supports uplink pre-compensation in wireless communications systems in accordance with one or more aspects of the present disclosure. The process flow 400 may implement aspects of the wireless communications systems 100 and 200 or may be implemented by aspects of the wireless communications systems 100 and 200 as described with reference to FIGS. 1 and 2, respectively. For example, the process flow 400 may be based on an uplink communications configuration from a base station 105-b (e.g., a network entity) or a satellite 160-d, and may be implemented by a UE 115-c. One or more of the base station 105-b, the UE 115-c, or the satellite 160-d may be examples of a base station 105, a UE 115, or a satellite 160, as described herein. In the following description of the process flow 400, the operations between one or more of the base station 105-b, the UE 115-c, or the satellite 160-d may be performed in a different order than the example order shown, or the operations performed by one or more of the base station 105-b, the UE 115-c, or the satellite 160-d may be performed in different orders or at different times. Some operations may also be omitted from the process flow 400, and other operations may be added to the process flow 400.

At 405, the base station 105-b may transmit an indication of an uplink communications configuration (e.g., the uplink communications configuration 285 described with reference to FIG. 2) for uplink wireless communications that span a set of TTIs. At 410, the satellite 160-d may transmit an indication of the uplink communications configuration for uplink wireless communications that span a set of TTIs. As described herein, a set of TTIs may refer to a set of slot durations in which the uplink wireless communications are scheduled. One or both of the base station 105-b or the satellite 160-d may transmit the indication of the uplink communications configuration via broadcast signaling (e.g., a SIB or PRACH configuration) or UE-specific signaling (e.g., dedicated RRC signaling). The indication of the uplink communications configuration may be based on a type of the uplink wireless communications (e.g., random access, uplink control, uplink data, SRS).

At 415, the UE 115-c may determine a pre-compensation duration (e.g., the pre-compensation duration 225-a described with reference to FIG. 2) for the uplink wireless communications. For example, the UE 115-c may determine a duration of time for which uplink pre-compensation is to be applied to the uplink wireless communications. That is, the UE 115-c may apply the same pre-compensation to the uplink wireless communications during the pre-compensation duration. The pre-compensation duration may be based on one or more parameters of the uplink communications configuration indicated by one or more of the base station 105-b or the satellite 160-d. At 420, the UE 115-c may transmit the uplink wireless communications to the base station 105-b (with the uplink pre-compensation applied) during the pre-compensation duration. Additionally or alternatively, the UE 115-c may transmit the uplink wireless communications to the satellite 160-d at 425 (with the uplink pre-compensation applied) during the pre-compensation duration.

Figure 5:
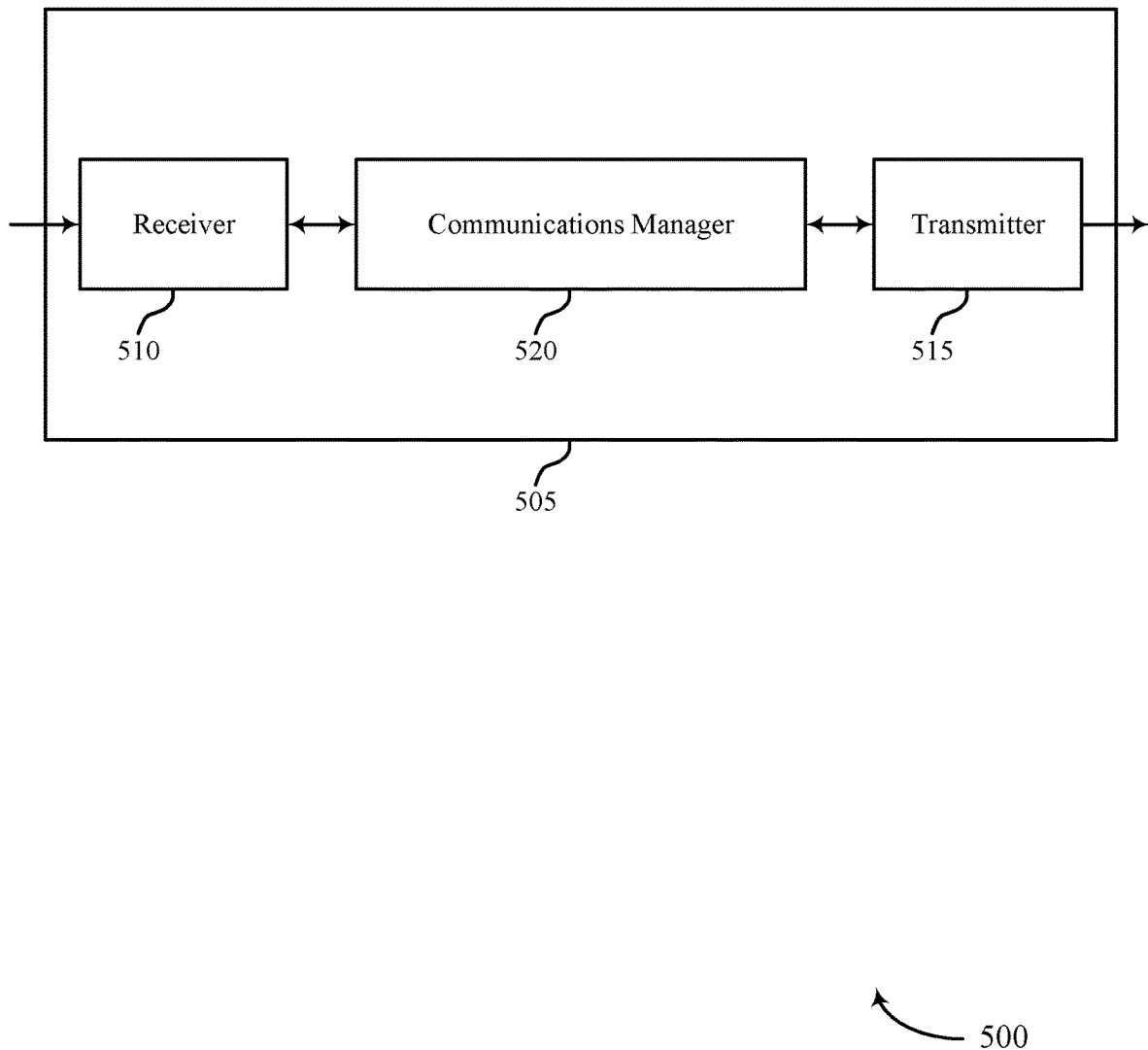
FIGS. 5 and 6 show block diagrams of devices that support uplink pre-compensation in wireless communications systems in accordance with one or more aspects of the present disclosure.

FIG. 5 shows a block diagram 500 of a device 505 that supports uplink pre-compensation in wireless communications systems in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink pre-compensation in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink pre-compensation in wireless communications systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink pre-compensation in wireless communications systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 (e.g., a UE) in accordance with examples as disclosed herein. For example, the communications manager 520 may be configured as or otherwise support a means for receiving, via broadcast signaling or UE-specific signaling, an indication of an uplink communications configuration that pertains to uplink wireless communications spanning a set of TTIs, where the indication is based on a type of the uplink wireless communications. The communications manager 520 may be configured as or otherwise support a means for determining a duration of time during which an uplink pre-compensation is to be applied to an uplink wireless communication, where the duration of time is based on one or more parameters of the uplink communications configuration. The communications manager 520 may be configured as or otherwise support a means for transmitting the uplink wireless communication using the uplink pre-compensation during the duration of time. By including or configuring the communications manager 520 in accordance with examples as described herein, the device 505 (e.g., a processor controlling or otherwise coupled to the receiver 510, the transmitter 515, the communications manager 520, or a combination thereof) may support techniques for power saving.

Figure 6:
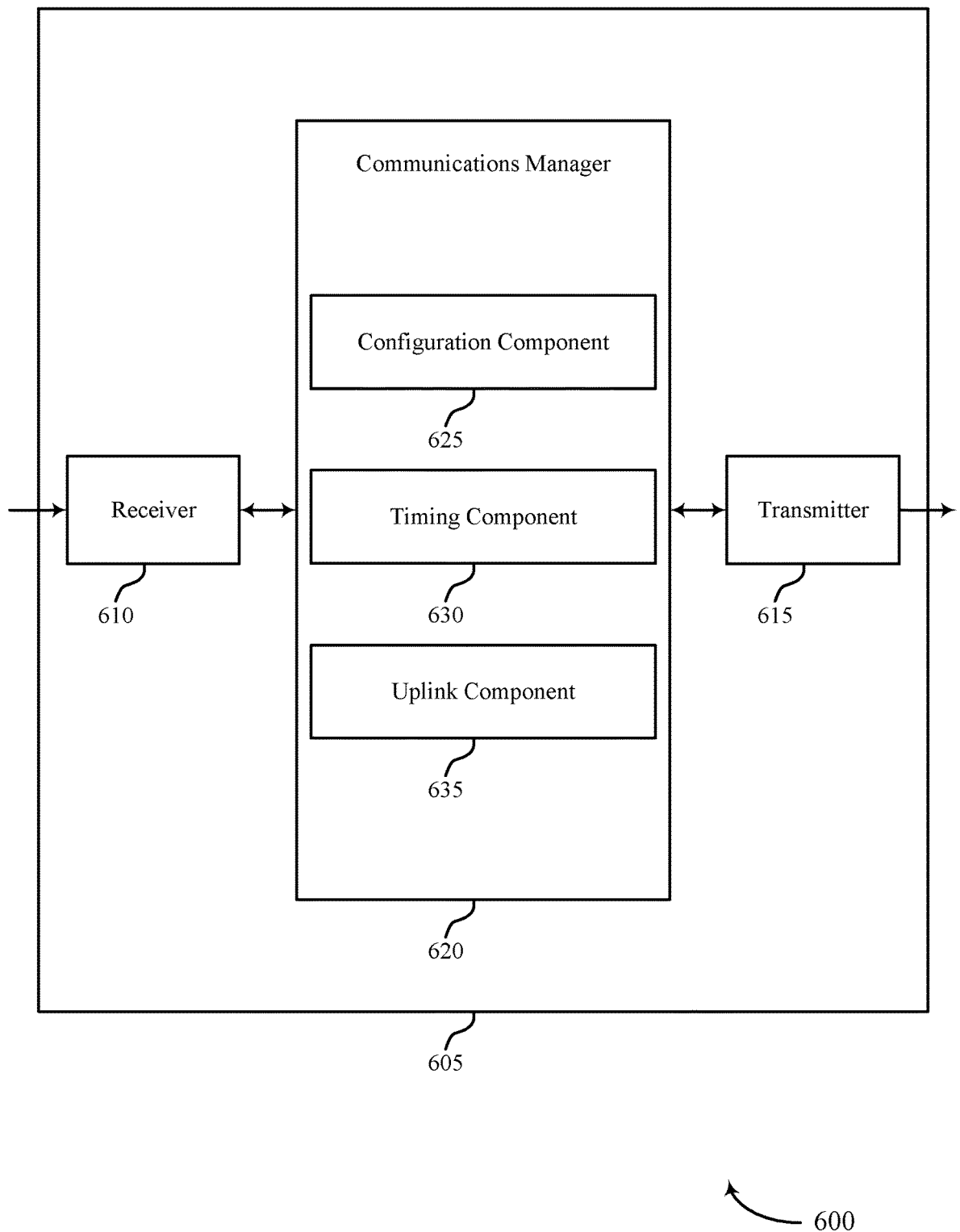

FIG. 6 shows a block diagram 600 of a device 605 that supports uplink pre-compensation in wireless communications systems in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink pre-compensation in wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink pre-compensation in wireless communications systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink pre-compensation in wireless communications systems as described herein. For example, the communications manager 620 may include a configuration component 625, a timing component 630, an uplink component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a UE) in accordance with examples as disclosed herein. The configuration component 625 may be configured as or otherwise support a means for receiving, via broadcast signaling or UE-specific signaling, an indication of an uplink communications configuration that pertains to uplink wireless communications spanning a set of TTIs, where the indication is based on a type of the uplink wireless communications. The timing component 630 may be configured as or otherwise support a means for determining a duration of time during which an uplink pre-compensation is to be applied to an uplink wireless communication, where the duration of time is based on one or more parameters of the uplink communications configuration. The uplink component 635 may be configured as or otherwise support a means for transmitting the uplink wireless communication using the uplink pre-compensation during the duration of time.

Figure 7:
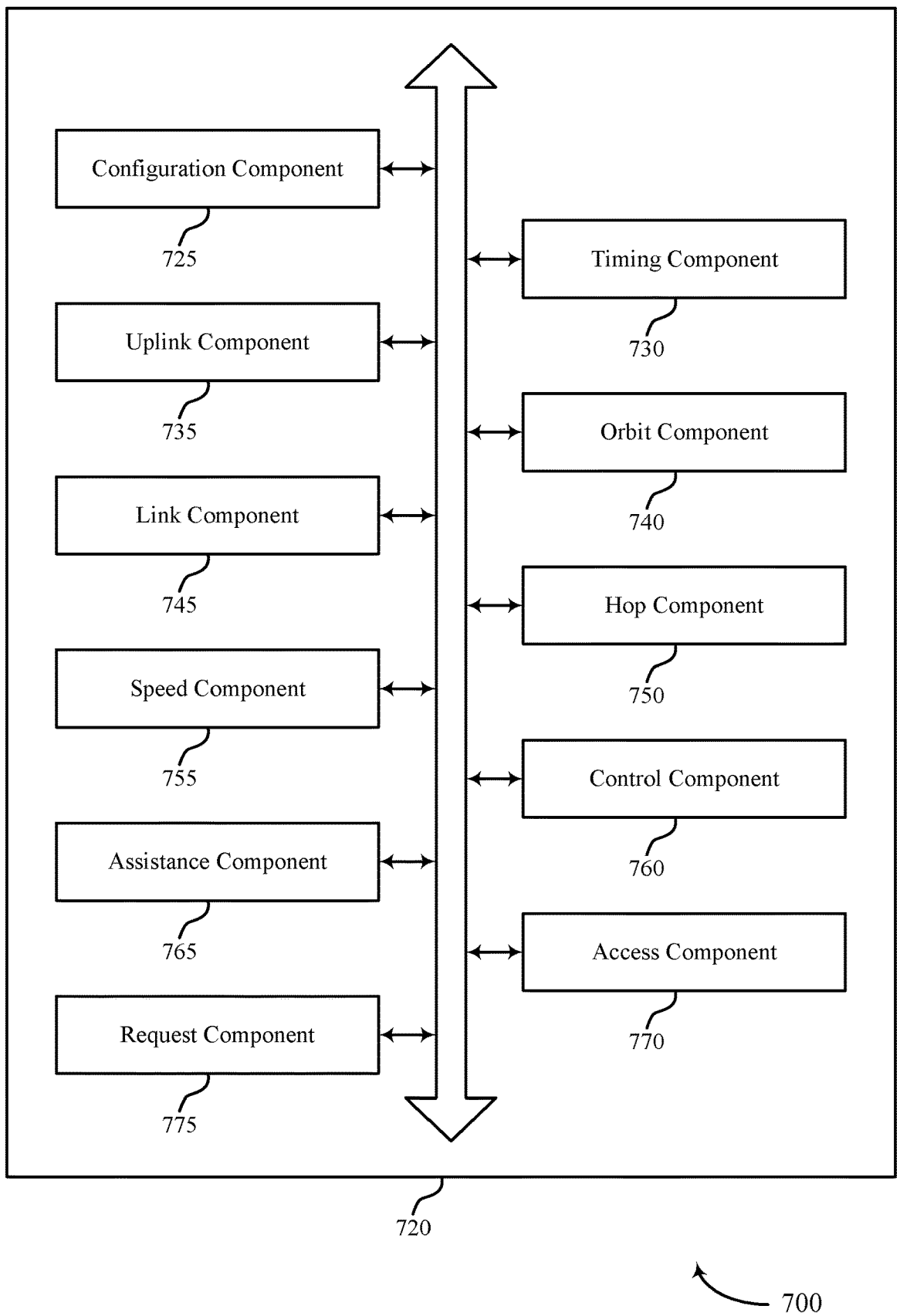
FIG. 7 shows a block diagram of a communications manager that supports uplink pre-compensation in wireless communications systems in accordance with one or more aspects of the present disclosure.

FIG. 7 shows a block diagram 700 of a communications manager 720 that supports uplink pre-compensation in wireless communications systems in accordance with one or more aspects of the present disclosure. The communications manager 720 may be an example of aspects of a communications manager 520, a communications manager 620, or both, as described herein. The communications manager 720, or various components thereof, may be an example of means for performing various aspects of uplink pre-compensation in wireless communications systems as described herein. For example, the communications manager 720 may include a configuration component 725, a timing component 730, an uplink component 735, an orbit component 740, a link component 745, a hop component 750, a speed component 755, a control component 760, an assistance component 765, an access component 770, a request component 775, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving, via broadcast signaling or UE-specific signaling, an indication of an uplink communications configuration that pertains to uplink wireless communications spanning a set of TTIs, where the indication is based on a type of the uplink wireless communications. In some examples, the broadcast signaling or the UE-specific signaling includes one or more of a dedicated RRC message, a SIB, or a PRACH message. In some examples, the uplink communications configuration pertains to NB-IoT communications, eMTC communications, or NR communications in a non-terrestrial network.

The timing component 730 may be configured as or otherwise support a means for determining a duration of time during which an uplink pre-compensation is to be applied to an uplink wireless communication, where the duration of time is based on one or more parameters of the uplink communications configuration. The uplink component 735 may be configured as or otherwise support a means for transmitting the uplink wireless communication using the uplink pre-compensation during the duration of time.

In some examples, to support determining the duration of time during which the uplink pre-compensation is to be applied, the orbit component 740 may be configured as or otherwise support a means for determining a type of satellite orbit associated with a satellite to which the UE transmits the uplink wireless communication. In some examples, to support determining the duration of time during which the uplink pre-compensation is to be applied, the timing component 730 may be configured as or otherwise support a means for determining the duration of time based on the one or more parameters of the uplink communications configuration indicating the type of satellite orbit associated with the satellite. In some examples, the orbit component 740 may be configured as or otherwise support a means for determining that the type of satellite orbit includes one or more of a GEO or a LEO. In some examples, the timing component 730 may be configured as or otherwise support a means for determining the duration of time based on the one or more parameters of the uplink communications configuration indicating that the type of satellite orbit includes one or more of the GEO or the LEO. In some examples, a respective duration of time during which the uplink pre-compensation is to be applied for the GEO is greater than a respective duration of time during which the uplink pre-compensation is to be applied for the LEO.

In some examples, to support determining the duration of time during which the uplink pre-compensation is to be applied, the link component 745 may be configured as or otherwise support a means for receiving a downlink communication from a satellite, and determining whether a communication link from a ground gateway to a satellite is pre-compensated based on the downlink communication. In some examples, to support determining the duration of time during which the uplink pre-compensation is to be applied, the timing component 730 may be configured as or otherwise support a means for determining the duration of time based on whether the communication link from the ground gateway to the satellite is pre-compensated. In some examples, the duration of time differs based on whether the communication link from the ground gateway to the satellite is pre-compensated.

In some examples, to support determining the duration of time during which the uplink pre-compensation is to be applied, the hop component 750 may be configured as or otherwise support a means for determining that frequency hopping is enabled for the uplink wireless communication spanning the set of TTIs. In some examples, to support determining the duration of time during which the uplink pre-compensation is to be applied, the hop component 750 may be configured as or otherwise support a means for determining a frequency hopping interval for the uplink wireless communication spanning the set of TTIs. In some examples, to support determining the duration of time during which the uplink pre-compensation is to be applied, the timing component 730 may be configured as or otherwise support a means for determining the duration of time based on the one or more parameters of the uplink communications configuration indicating that the frequency hopping is enabled for the uplink wireless communication and the frequency hopping interval.

In some examples, the timing component 730 may be configured as or otherwise support a means for determining a second duration of time during which the uplink pre-compensation is to be applied when the frequency hopping is disabled. In some examples, the timing component 730 may be configured as or otherwise support a means for determining the duration of time based on whether the frequency hopping interval is larger or smaller than the second duration of time. In some examples, the duration of time is equal to the second duration of time based on that the frequency hopping interval is larger than the second duration of time, or the duration of time is equal to the frequency hopping interval based on that the frequency hopping interval is smaller than the second duration of time.

In some examples, to support determining the duration of time during which the uplink pre-compensation is to be applied, the speed component 755 may be configured as or otherwise support a means for determining a mobility characteristic of the UE. In some examples, to support determining the duration of time during which the uplink pre-compensation is to be applied, the timing component 730 may be configured as or otherwise support a means for determining the duration of time based on the mobility characteristic of the UE. In some examples, the duration of time differs based on whether the uplink pre-compensation is for mitigation of a propagation delay or a Doppler frequency shift.

In some examples, to support determining the duration of time during which the uplink pre-compensation is to be applied, the control component 760 may be configured as or otherwise support a means for receiving one or more of an RRC message, a MAC-CE, or a DCI including an indication of the duration of time. In some examples, the request component 775 may be configured as or otherwise support a means for transmitting a request to update the duration of time. In some examples, the assistance component 765 may be configured as or otherwise support a means for transmitting UE assistance information including an indication of the duration of time.

In some examples, the access component 770 may be configured as or otherwise support a means for determining that the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of the one or more PRACH preambles. In some examples, the respective duration of time during which the respective uplink pre-compensation is to be applied to each respective PRACH preamble of the one or more PRACH preambles is based on a respective number of repetitions associated with each respective PRACH preamble.

In some examples, the uplink component 735 may be configured as or otherwise support a means for determining an updated uplink pre-compensation after an expiration of a first instance associated with the duration of time. In some examples, the uplink component 735 may be configured as or otherwise support a means for applying the updated uplink pre-compensation during a second instance associated with the duration of time in which the updated uplink pre-compensation is to be applied to the uplink wireless communication.

Figure 8:
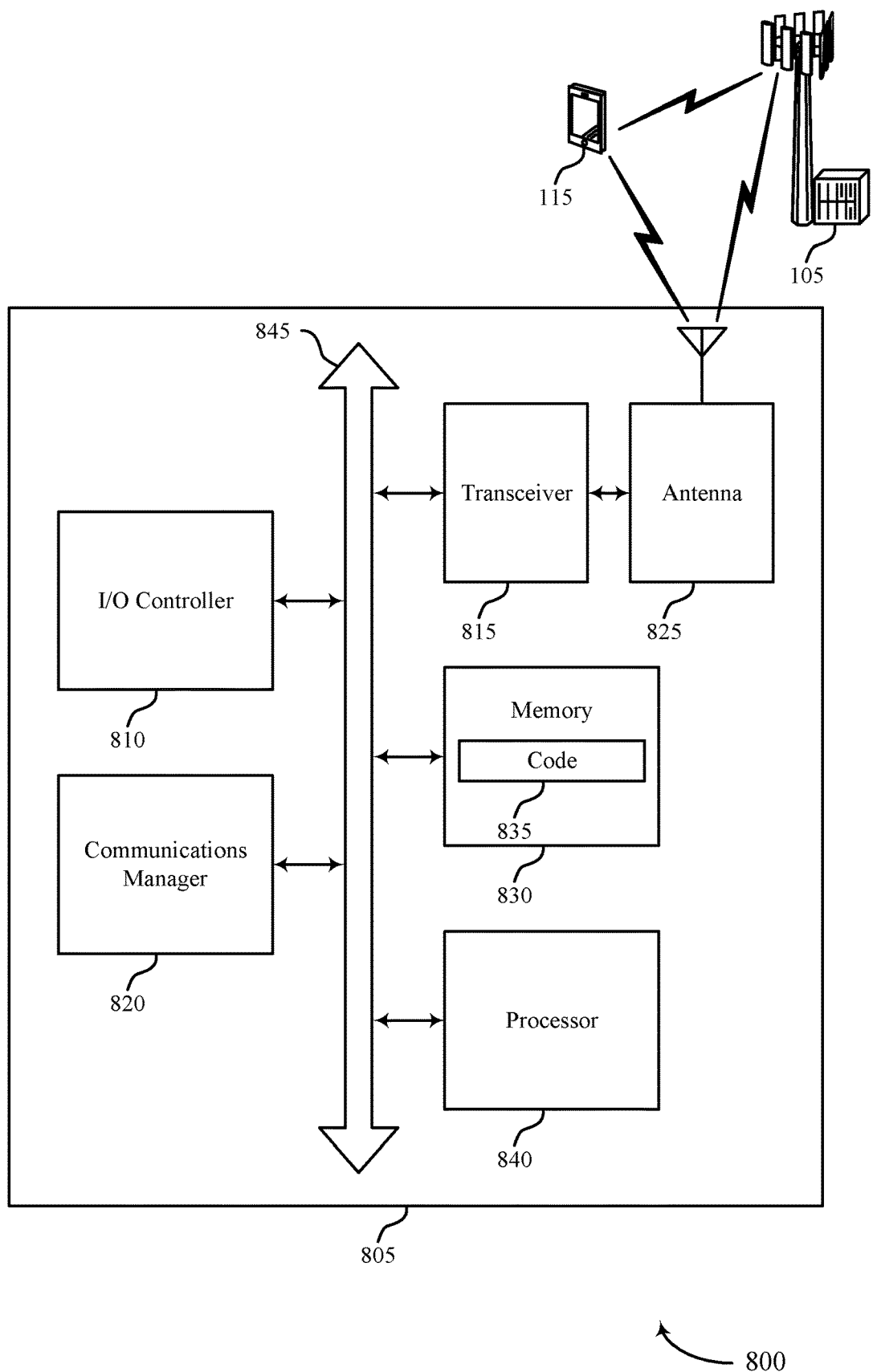
FIG. 8 shows a diagram of a system including a device that supports uplink pre-compensation in wireless communications systems in accordance with one or more aspects of the present disclosure.

FIG. 8 shows a diagram of a system 800 including a device 805 that supports uplink pre-compensation in wireless communications systems in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input-output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink pre-compensation in wireless communications systems). For example, the device 805 or a component of the device 805 may include a processor 840 and memory 830 coupled to the processor 840, the processor 840 and memory 830 configured to perform various functions described herein.

The communications manager 820 may support wireless communication at the device 805 (e.g., a UE) in accordance with examples as disclosed herein. For example, the communications manager 820 may be configured as or otherwise support a means for receiving, via broadcast signaling or UE-specific signaling, an indication of an uplink communications configuration that pertains to uplink wireless communications spanning a set of TTIs, where the indication is based on a type of the uplink wireless communications. The communications manager 820 may be configured as or otherwise support a means for determining a duration of time during which an uplink pre-compensation is to be applied to an uplink wireless communication, where the duration of time is based on one or more parameters of the uplink communications configuration. The communications manager 820 may be configured as or otherwise support a means for transmitting the uplink wireless communication using the uplink pre-compensation during the duration of time. By including or configuring the communications manager 820 in accordance with examples as described herein, the device 805 may support techniques for increased communication reliability, decreased latency, and more efficient coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of uplink pre-compensation in wireless communications systems as described herein, or the processor 840 and the memory 830 may be otherwise configured to perform or support such operations.

Figure 9:
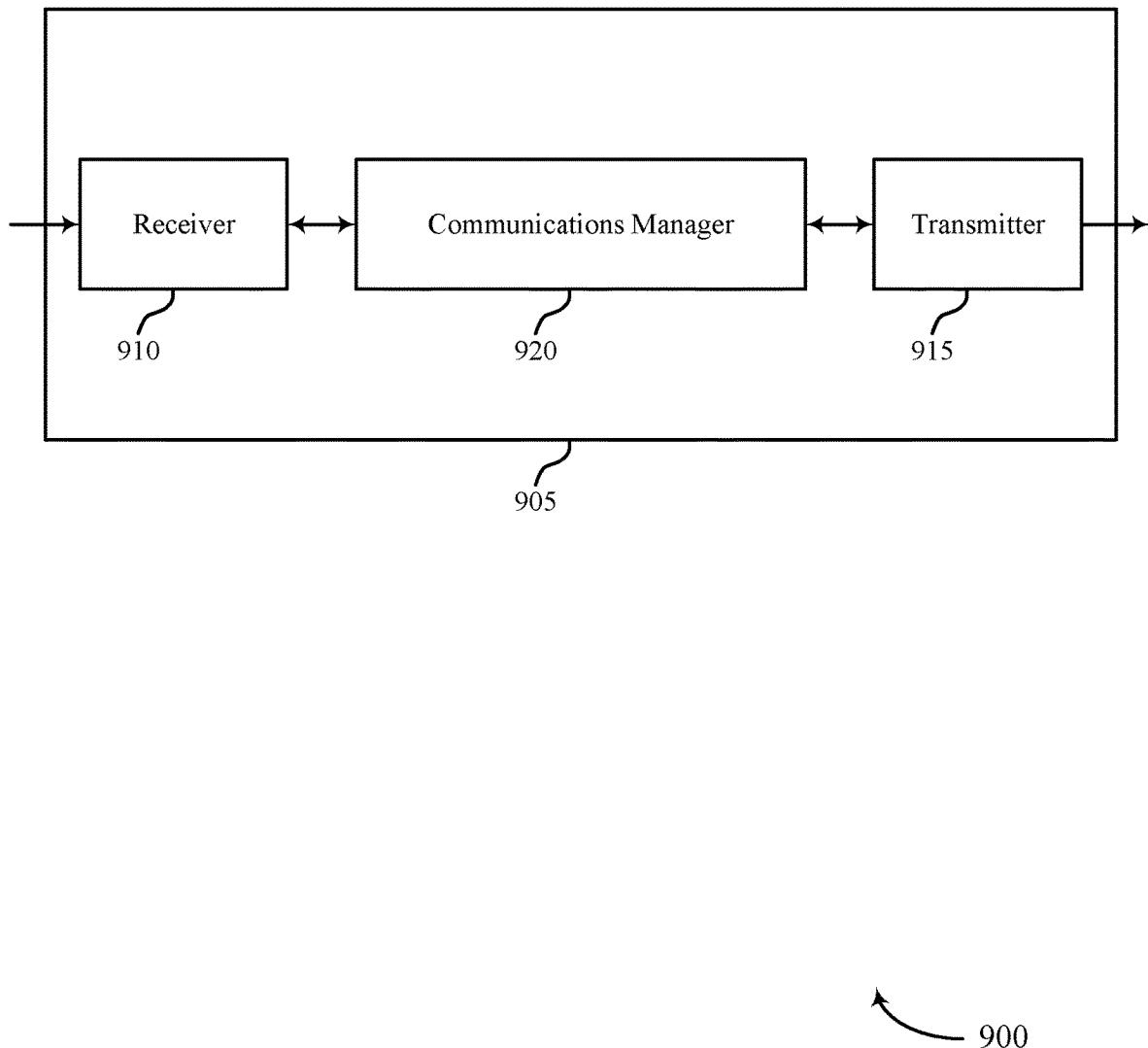
FIGS. 9 and 10 show block diagrams of devices that support uplink pre-compensation in wireless communications systems in accordance with one or more aspects of the present disclosure.

FIG. 9 shows a block diagram 900 of a device 905 that supports uplink pre-compensation in wireless communications systems in accordance with one or more aspects of the present disclosure. The device 905 may be an example of aspects of a network entity (e.g., a base station 105) described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink pre-compensation in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink pre-compensation in wireless communications systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink pre-compensation in wireless communications systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a network entity) in accordance with examples disclosed herein. For example, the communications manager 920 may be configured as or otherwise support a means for transmitting, via broadcast signaling or UE-specific signaling, an indication of an uplink communications configuration that pertains to uplink wireless communications spanning a set of TTIs, where the indication is based on a type of the uplink wireless communications. The communications manager 920 may be configured as or otherwise support a means for determining a duration of time during which an uplink pre-compensation is to be applied to an uplink wireless communication, where the duration of time is based on one or more parameters of the uplink communications configuration. The communications manager 920 may be configured as or otherwise support a means for receiving the uplink wireless communication using the uplink pre-compensation during the duration of time. By including or configuring the communications manager 920 in accordance with examples as described herein, the device 905 (e.g., a processor controlling or otherwise coupled to the receiver 910, the transmitter 915, the communications manager 920, or a combination thereof) may support techniques for power saving.

Figure 10:
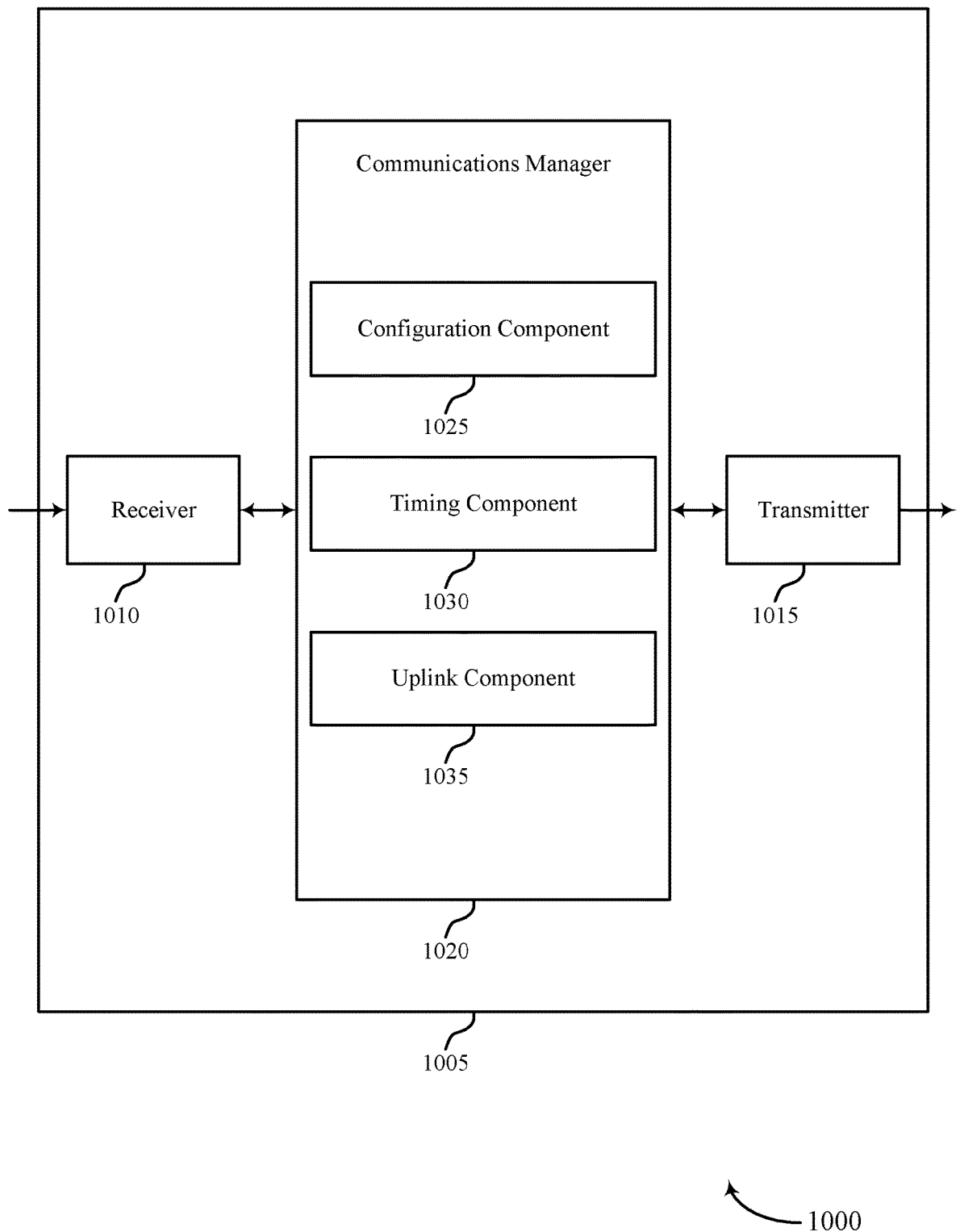

FIG. 10 shows a block diagram 1000 of a device 1005 that supports uplink pre-compensation in wireless communications systems in accordance with one or more aspects of the present disclosure. The device 1005 may be an example of aspects of a device 905 or a network entity (e.g., a base station 105) described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink pre-compensation in wireless communications systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink pre-compensation in wireless communications systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink pre-compensation in wireless communications systems as described herein. For example, the communications manager 1020 may include a configuration component 1025, a timing component 1030, an uplink component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a network entity) in accordance with examples as disclosed herein. The configuration component 1025 may be configured as or otherwise support a means for transmitting, via broadcast signaling or UE-specific signaling, an indication of an uplink communications configuration that pertains to uplink wireless communications spanning a set of TTIs, where the indication is based on a type of the uplink wireless communications. The timing component 1030 may be configured as or otherwise support a means for determining a duration of time during which an uplink pre-compensation is to be applied to an uplink wireless communication, where the duration of time is based on one or more parameters of the uplink communications configuration. The uplink component 1035 may be configured as or otherwise support a means for receiving the uplink wireless communication using the uplink pre-compensation during the duration of time.

Figure 11:
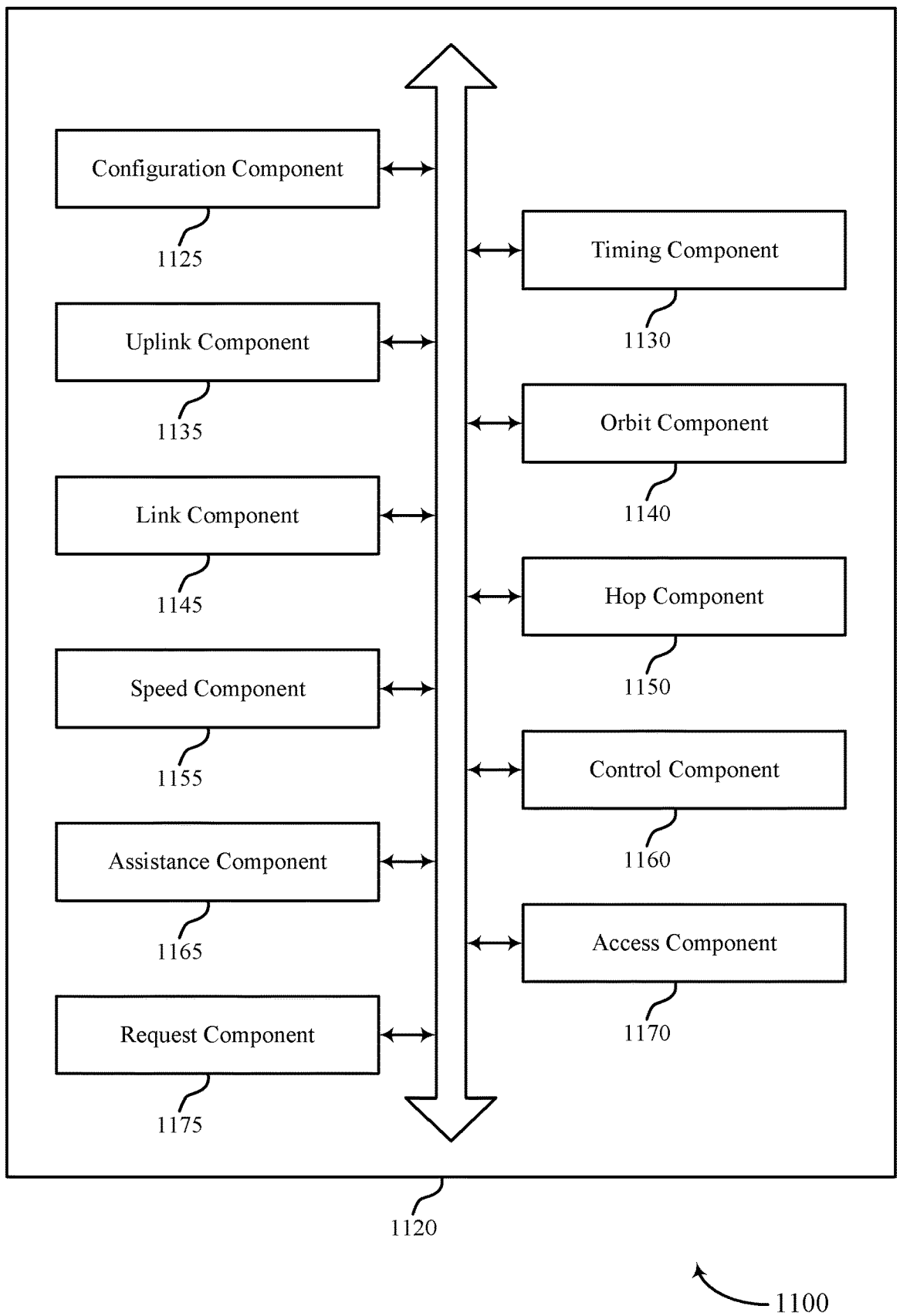
FIG. 11 shows a block diagram of a communications manager that supports uplink pre-compensation in wireless communications systems in accordance with one or more aspects of the present disclosure.

FIG. 11 shows a block diagram 1100 of a communications manager 1120 that supports uplink pre-compensation in wireless communications systems in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of uplink pre-compensation in wireless communications systems as described herein. For example, the communications manager 1120 may include a configuration component 1125, a timing component 1130, an uplink component 1135, an orbit component 1140, a link component 1145, a hop component 1150, a speed component 1155, a control component 1160, an assistance component 1165, an access component 1170, a request component 1175, or any combination thereof. Each of these components may communicate, directly or indirectly, with one another (e.g., via one or more buses).

The communications manager 1120 may support wireless communication at a network entity (e.g., a base station) in accordance with examples as disclosed herein. The configuration component 1125 may be configured as or otherwise support a means for transmitting, via broadcast signaling or UE-specific signaling, an indication of an uplink communications configuration that pertains to uplink wireless communications spanning a set of TTIs, where the indication is based on a type of the uplink wireless communications. Additionally or alternatively, the configuration component 1125 may be configured as or otherwise support a means for transmitting an indication of an uplink communications configuration that pertains to uplink wireless communications spanning a set of TTIs. In some examples, the broadcast signaling or the UE-specific signaling includes one or more of a dedicated RRC message, a SIB, or a PRACH message. In some examples, the uplink communications configuration pertains to NB-IoT communications, eMTC communications, or NR communications in a non-terrestrial network.

The timing component 1130 may be configured as or otherwise support a means for determining a duration of time during which an uplink pre-compensation is to be applied to an uplink wireless communication, where the duration of time is based on one or more parameters of the uplink communications configuration. The uplink component 1135 may be configured as or otherwise support a means for receiving the uplink wireless communication using the uplink pre-compensation during the duration of time.

In some examples, to support determining the duration of time during which the uplink pre-compensation is to be applied, the orbit component 1140 may be configured as or otherwise support a means for determining a type of satellite orbit associated with the base station to which the UE transmits the uplink wireless communication, the base station including a satellite. In some examples, to support determining the duration of time during which the uplink pre-compensation is to be applied, the timing component 1130 may be configured as or otherwise support a means for determining the duration of time based on the one or more parameters of the uplink communications configuration indicating the type of satellite orbit associated with the satellite.

In some examples, the orbit component 1140 may be configured as or otherwise support a means for determining that the type of satellite orbit includes one or more of a GEO or a LEO. In some examples, the timing component 1130 may be configured as or otherwise support a means for determining the duration of time based on the one or more parameters of the uplink communications configuration indicating that the type of satellite orbit includes one or more of the GEO or the LEO. In some examples, a respective duration of time during which the uplink pre-compensation is to be applied for the GEO is greater than a respective duration of time during which the uplink pre-compensation is to be applied for the LEO.

In some examples, to support determining the duration of time during which the uplink pre-compensation is to be applied, the link component 1145 may be configured as or otherwise support a means for determining whether a communication link from a ground gateway to the base station is pre-compensated. In some examples, to support determining the duration of time during which the uplink pre-compensation is to be applied, the timing component 1130 may be configured as or otherwise support a means for determining the duration of time based on whether the communication link from the ground gateway to the base station is pre-compensated. In some examples, the duration of time differs based on whether the communication link from the ground gateway to the base station is pre-compensated.

In some examples, to support determining the duration of time during which the uplink pre-compensation is to be applied, the hop component 1150 may be configured as or otherwise support a means for determining that frequency hopping is enabled for the uplink wireless communication spanning the set of TTIs. In some examples, to support determining the duration of time during which the uplink pre-compensation is to be applied, the hop component 1150 may be configured as or otherwise support a means for determining a frequency hopping interval for the uplink wireless communication spanning the set of TTIs. In some examples, to support determining the duration of time during which the uplink pre-compensation is to be applied, the timing component 1130 may be configured as or otherwise support a means for determining the duration of time based on the one or more parameters of the uplink communications configuration indicating that the frequency hopping is enabled for the uplink wireless communication and the frequency hopping interval.

The timing component 1130 may be configured as or otherwise support a means for determining a second duration of time during which the uplink pre-compensation is to be applied when the frequency hopping is disabled. The timing component 1130 may be configured as or otherwise support a means for determining the duration of time based on whether a time duration of the frequency hopping interval is longer or shorter than the second duration of time. In some examples, the duration of time is equal to the second duration of time when the time duration of the frequency hopping interval is larger than the second duration of time.

In other examples, the duration of time is equal to the time duration of the frequency hopping interval when the time duration of the frequency hopping interval is shorter than the second duration of time.

In some examples, to support determining the duration of time for which the uplink pre-compensation is to be applied, the speed component 1155 may be configured as or otherwise support a means for determining a mobility characteristic of the UE. In some examples, to support determining the duration of time during which the uplink pre-compensation is to be applied, the timing component 1130 may be configured as or otherwise support a means for determining the duration of time based on the mobility characteristic of the UE. In some examples, the duration of time differs based on whether the uplink pre-compensation is for mitigation of a propagation delay or a Doppler frequency shift. In some examples, the control component 1160 may be configured as or otherwise support a means for transmitting one or more of an RRC message, a MAC-CE, or a DCI including an indication of the duration of time. In some examples, the request component 1175 may be configured as or otherwise support a means for receiving a request to update the duration of time. In some examples, the assistance component 1165 may be configured as or otherwise support a means for receiving UE assistance information including an indication of the duration of time.

In some examples, the access component 1170 may be configured as or otherwise support a means for determining that the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of each of the one or more PRACH preamble. In some examples, the respective duration of time during which the respective uplink pre-compensation is to be applied to the respective PRACH preamble of the one or more PRACH preambles is based on a respective number of repetitions associated with each respective PRACH preamble.

In some examples, the uplink component 1135 may be configured as or otherwise support a means for determining an updated uplink pre-compensation after an expiration of a first instance associated with the duration of time. In some examples, the uplink component 1135 may be configured as or otherwise support a means for applying the updated uplink pre-compensation during a second instance associated with the duration of time in which the updated uplink pre-compensation is to be applied to the uplink wireless communication.

Figure 12:
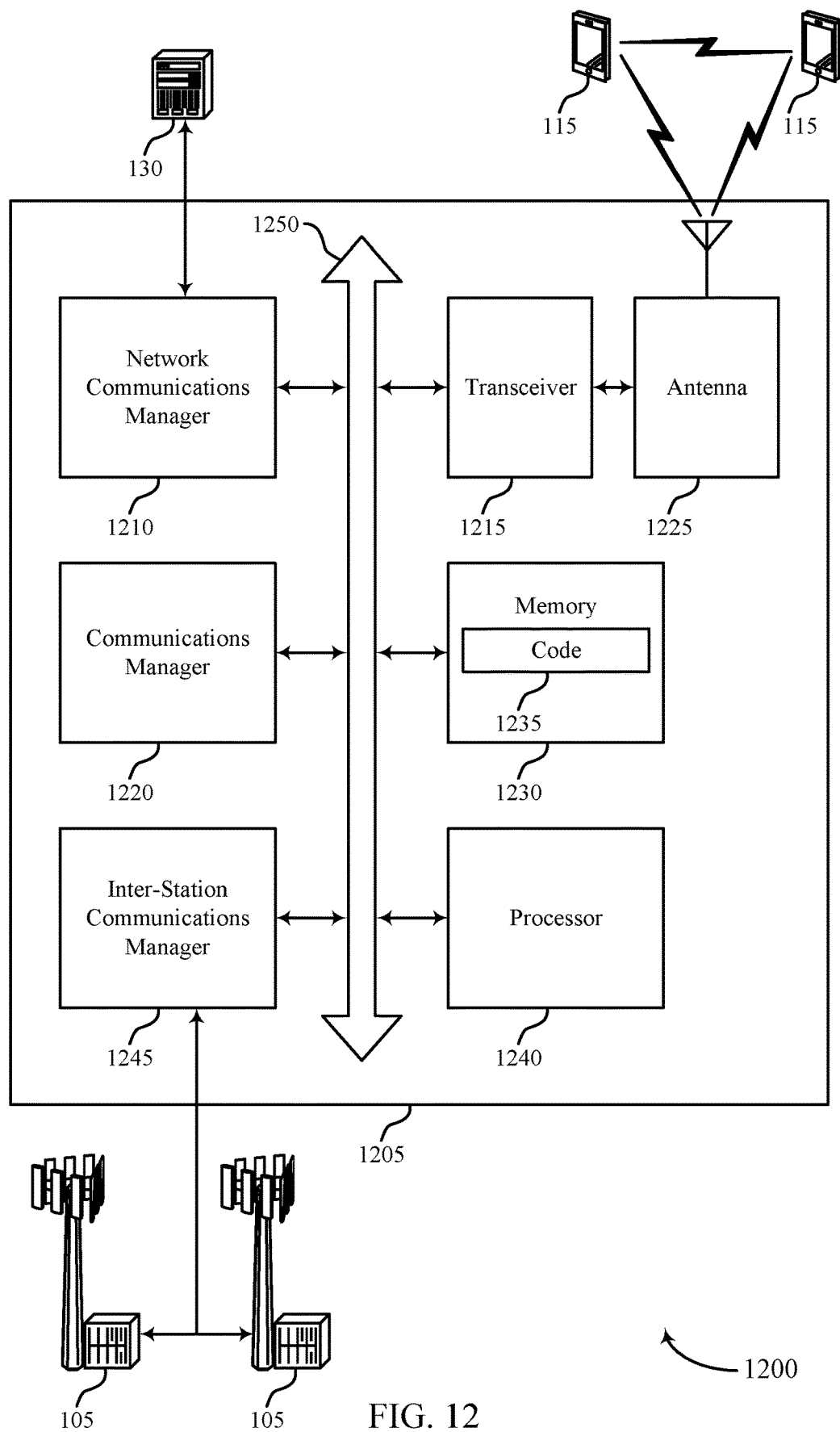
FIG. 12 shows a diagram of a system including a device that supports uplink pre-compensation in wireless communications systems in accordance with one or more aspects of the present disclosure.

FIG. 12 shows a diagram of a system 1200 including a device 1205 that supports uplink pre-compensation in wireless communications systems in accordance with one or more aspects of the present disclosure. The device 1205 may be an example of or include the components of a device 905, a device 1005, or a network entity (e.g., a base station 105) described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink pre-compensation in wireless communications systems). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a network entity (e.g., a base station) in accordance with examples as disclosed herein. For example, the communications manager 1220 may be configured as or otherwise support a means for transmitting, via broadcast signaling or UE-specific signaling, an indication of an uplink communications configuration that pertains to uplink wireless communications spanning a set of TTIs, where the indication is based on a type of the one or more uplink wireless communications. Additionally or alternatively, the communications manager 1220 may be configured as or otherwise support a means for transmitting an indication of an uplink communications configuration that pertains to uplink wireless communications spanning a set of TTIs. The communications manager 1220 may be configured as or otherwise support a means for determining a duration of time during which an uplink pre-compensation is to be applied to an uplink wireless communication, where the duration of time is based on one or more parameters of the uplink communications configuration. The communications manager 1220 may be configured as or otherwise support a means for receiving the uplink wireless communication using the uplink pre-compensation during the duration of time. By including or configuring the communications manager 1220 in accordance with examples as described herein, the device 1205 may support techniques for higher communication reliability and efficient coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink pre-compensation in wireless communications systems as described herein, or the processor 1240 and the memory 1230 may be otherwise configured to perform or support such operations.

Figure 13:
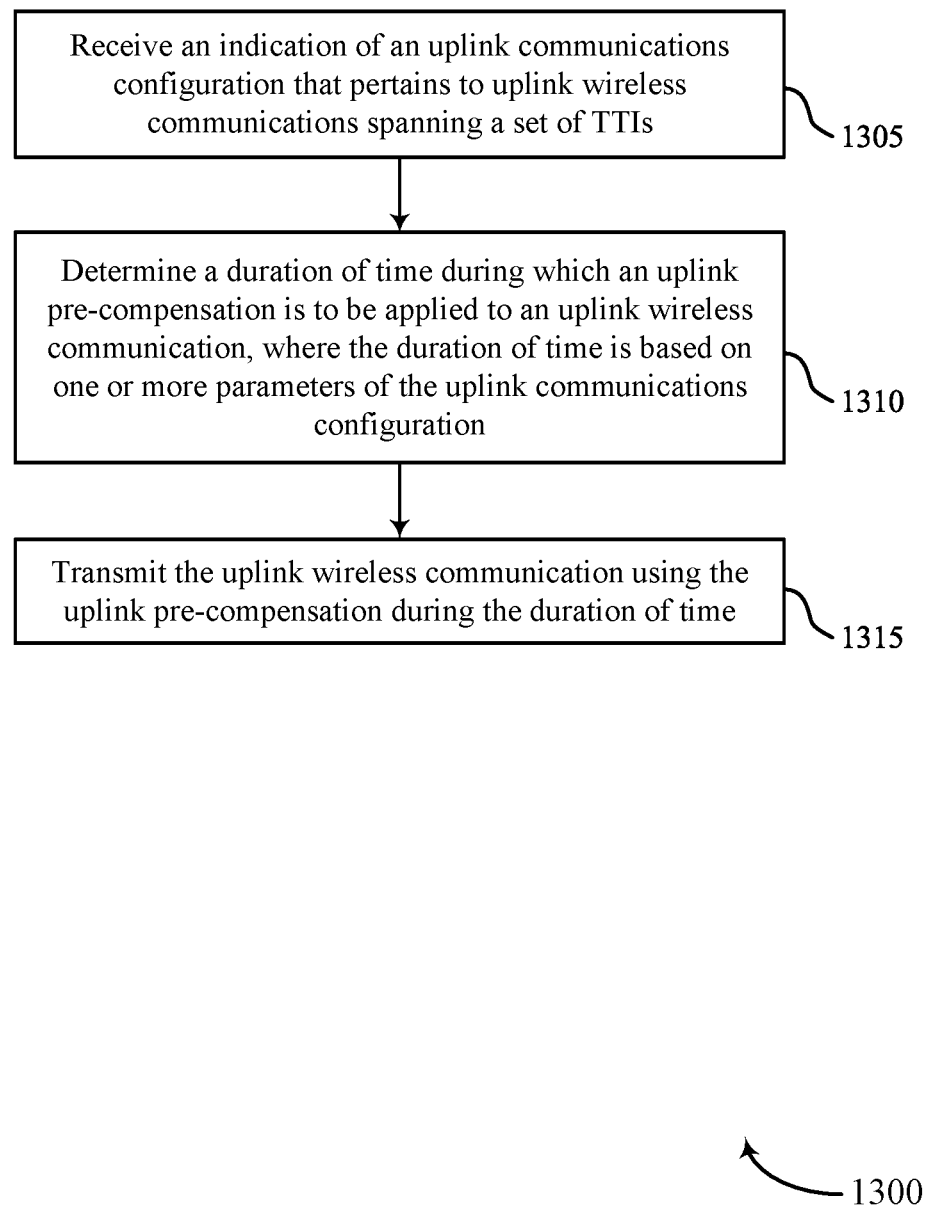
FIGS. 13 through 20 show flowcharts illustrating methods that support uplink pre-compensation in wireless communications systems in accordance with one or more aspects of the present disclosure.

FIG. 13 shows a flowchart illustrating a method 1300 that supports uplink pre-compensation in wireless communications systems in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving an indication of an uplink communications configuration that pertains to uplink wireless communications spanning a set of TTIs. The operations of 1305 may be performed in accordance with examples as disclosed herein. In some examples, aspects of the operations of 1305 may be performed by a configuration component 725 as described with reference to FIG. 7.

At 1310, the method may include determining a duration of time during which an uplink pre-compensation is to be applied to an uplink wireless communication, where the duration of time is based on one or more parameters of the uplink communications configuration. The operations of 1310 may be performed in accordance with examples as disclosed herein. In some examples, aspects of the operations of 1310 may be performed by a timing component 730 as described with reference to FIG. 7.

At 1315, the method may include transmitting the uplink wireless communication using the uplink pre-compensation during the duration of time. The operations of 1315 may be performed in accordance with examples as disclosed herein. In some examples, aspects of the operations of 1315 may be performed by an uplink component 735 as described with reference to FIG. 7.

Figure 14:
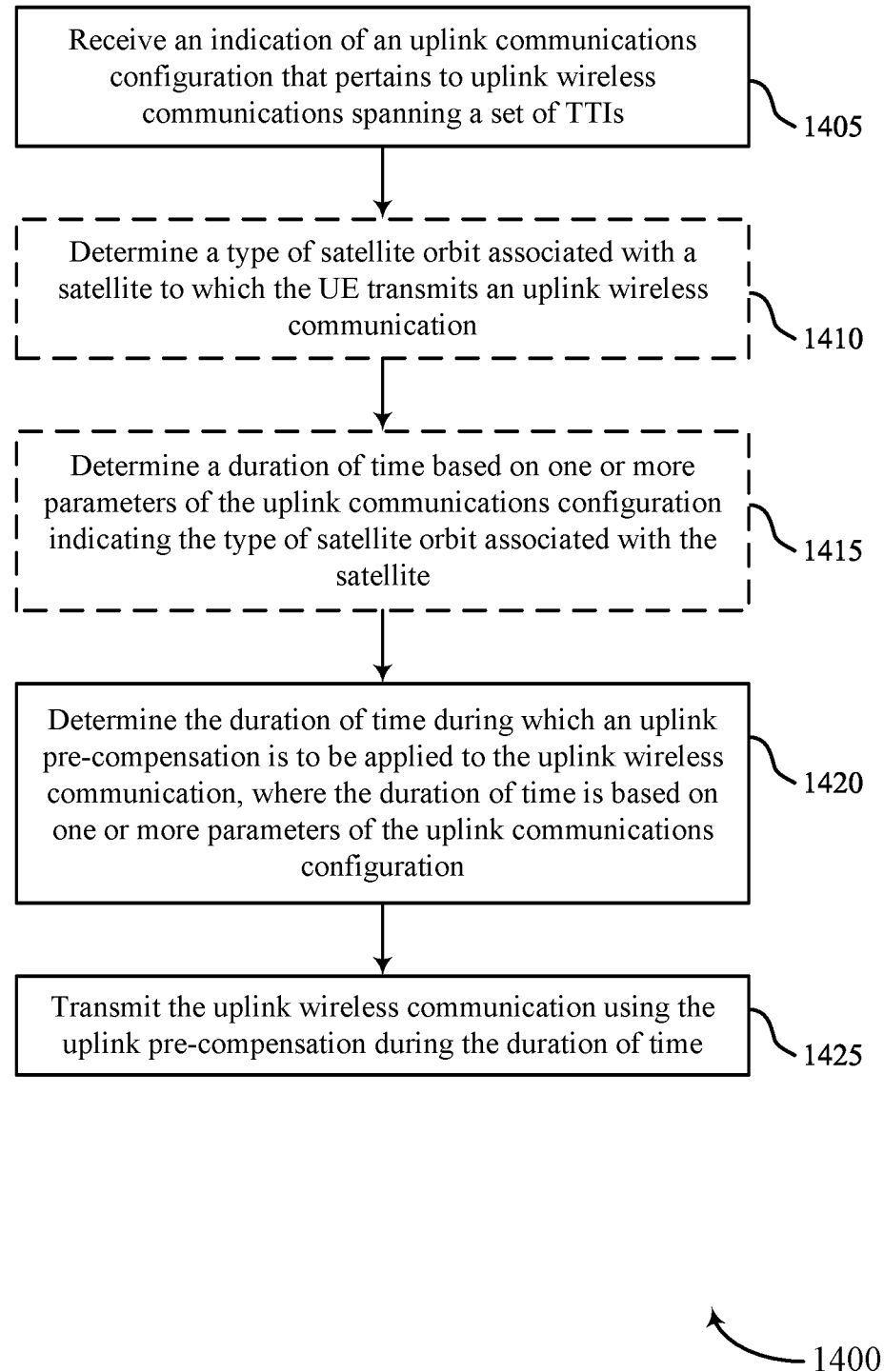

FIG. 14 shows a flowchart illustrating a method 1400 that supports uplink pre-compensation in wireless communications systems in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving an indication of an uplink communications configuration that pertains to uplink wireless communications spanning a set of TTIs. The operations of 1405 may be performed in accordance with examples as disclosed herein. In some examples, aspects of the operations of 1405 may be performed by a configuration component 725 as described with reference to FIG. 7.

At 1410, the method may include determining a type of satellite orbit associated with a satellite to which the UE transmits an uplink wireless communication. The operations of 1410 may be performed in accordance with examples as disclosed herein. In some examples, aspects of the operations of 1410 may be performed by an orbit component 740 as described with reference to FIG. 7.

At 1415, the method may include determining a duration of time based on one or more parameters of the uplink communications configuration indicating the type of satellite orbit associated with the satellite. The operations of 1415 may be performed in accordance with examples as disclosed herein. In some examples, aspects of the operations of 1415 may be performed by a timing component 730 as described with reference to FIG. 7.

At 1420, the method may include determining the duration of time during which an uplink pre-compensation is to be applied to the uplink wireless communication, where the duration of time is based on the one or more parameters of the uplink communications configuration. The operations of 1420 may be performed in accordance with examples as disclosed herein. In some examples, aspects of the operations of 1420 may be performed by a timing component 730 as described with reference to FIG. 7.

At 1425, the method may include transmitting the uplink wireless communication using the uplink pre-compensation during the duration of time. The operations of 1425 may be performed in accordance with examples as disclosed herein. In some examples, aspects of the operations of 1425 may be performed by an uplink component 735 as described with reference to FIG. 7.

Figure 15:
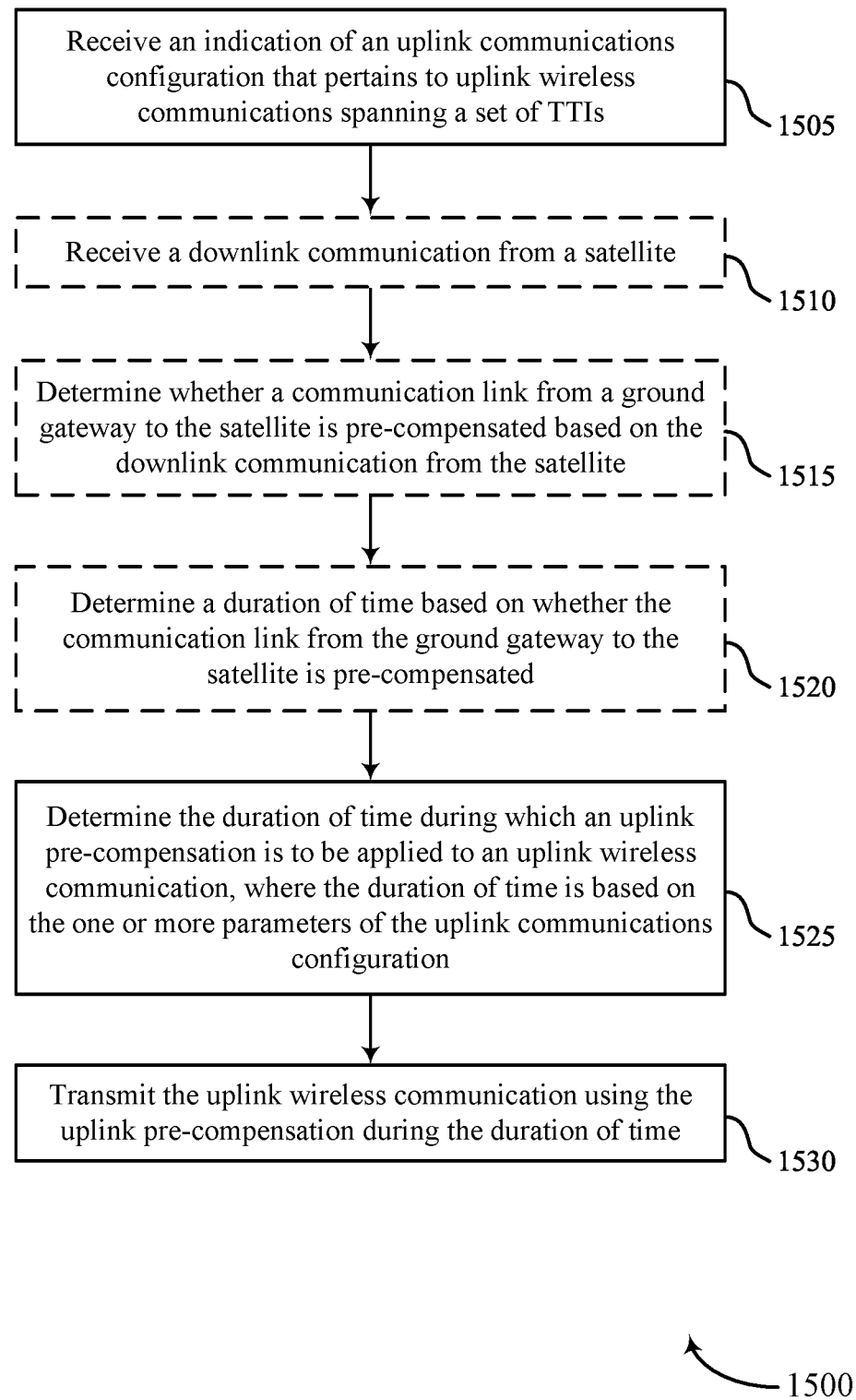

FIG. 15 shows a flowchart illustrating a method 1500 that supports uplink pre-compensation in wireless communications systems in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving an indication of an uplink communications configuration that pertains to uplink wireless communications spanning a set of TTIs. The operations of 1505 may be performed in accordance with examples as disclosed herein. In some examples, aspects of the operations of 1505 may be performed by a configuration component 725 as described with reference to FIG. 7.

At 1510, the method may include receiving a downlink communication from a satellite. The operations of 1510 may be performed in accordance with examples as disclosed herein. In some examples, aspects of the operations of 1510 may be performed by a control component 760 as described with reference to FIG. 7.

At 1515, the method may include determining whether a communication link from a ground gateway to the satellite is pre-compensated based on the downlink communication from the satellite. The operations of 1515 may be performed in accordance with examples as disclosed herein. In some examples, aspects of the operations of 1515 may be performed by a link component 745 as described with reference to FIG. 7.

At 1520, the method may include determining a duration of time based on whether the communication link from the ground gateway to the satellite is pre-compensated. The operations of 1520 may be performed in accordance with examples as disclosed herein. In some examples, aspects of the operations of 1520 may be performed by a timing component 730 as described with reference to FIG. 7.

At 1525, the method may include determining the duration of time during which an uplink pre-compensation is to be applied to an uplink wireless communication, where the duration of time is based on the one or more parameters of the uplink communications configuration. The operations of 1525 may be performed in accordance with examples as disclosed herein. In some examples, aspects of the operations of 1525 may be performed by a timing component 730 as described with reference to FIG. 7.

At 1530, the method may include transmitting the uplink wireless communication using the uplink pre-compensation during the duration of time. The operations of 1530 may be performed in accordance with examples as disclosed herein. In some examples, aspects of the operations of 1530 may be performed by an uplink component 735 as described with reference to FIG. 7.

Figure 16:
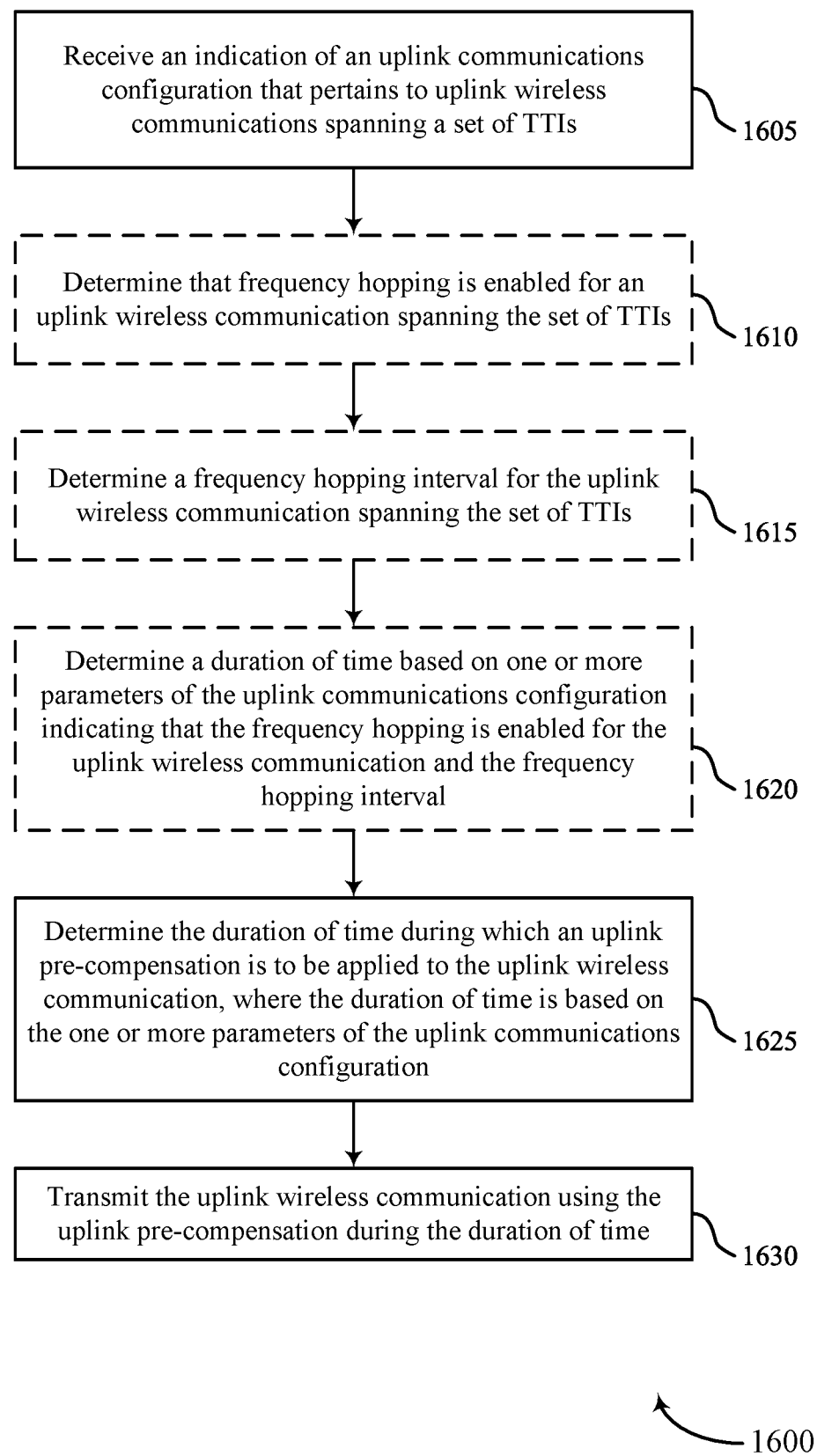

FIG. 16 shows a flowchart illustrating a method 1600 that supports uplink pre-compensation in wireless communications systems in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving an indication of an uplink communications configuration that pertains to uplink wireless communications spanning a set of TTIs. The operations of 1605 may be performed in accordance with examples as disclosed herein. In some examples, aspects of the operations of 1605 may be performed by a configuration component 725 as described with reference to FIG. 7.

At 1610, the method may include determining that frequency hopping is enabled for an uplink wireless communication spanning the set of TTIs. The operations of 1610 may be performed in accordance with examples as disclosed herein. In some examples, aspects of the operations of 1610 may be performed by a hop component 750 as described with reference to FIG. 7.

At 1615, the method may include determining a frequency hopping interval for the uplink wireless communication spanning the set of TTIs. The operations of 1615 may be performed in accordance with examples as disclosed herein. In some examples, aspects of the operations of 1615 may be performed by a hop component 750 as described with reference to FIG. 7.

At 1620, the method may include determining a duration of time based on one or more parameters of the uplink communications configuration indicating that the frequency hopping is enabled for the uplink wireless communication and the frequency hopping interval. The operations of 1620 may be performed in accordance with examples as disclosed herein. In some examples, aspects of the operations of 1620 may be performed by a timing component 730 as described with reference to FIG. 7.

At 1625, the method may include determining the duration of time during which an uplink pre-compensation is to be applied to the uplink wireless communication, where the duration of time is based on the one or more parameters of the uplink communications configuration. The operations of 1625 may be performed in accordance with examples as disclosed herein. In some examples, aspects of the operations of 1625 may be performed by a timing component 730 as described with reference to FIG. 7.

At 1630, the method may include transmitting the uplink wireless communication using the uplink pre-compensation during the duration of time. The operations of 1630 may be performed in accordance with examples as disclosed herein. In some examples, aspects of the operations of 1630 may be performed by an uplink component 735 as described with reference to FIG. 7.

Figure 17:
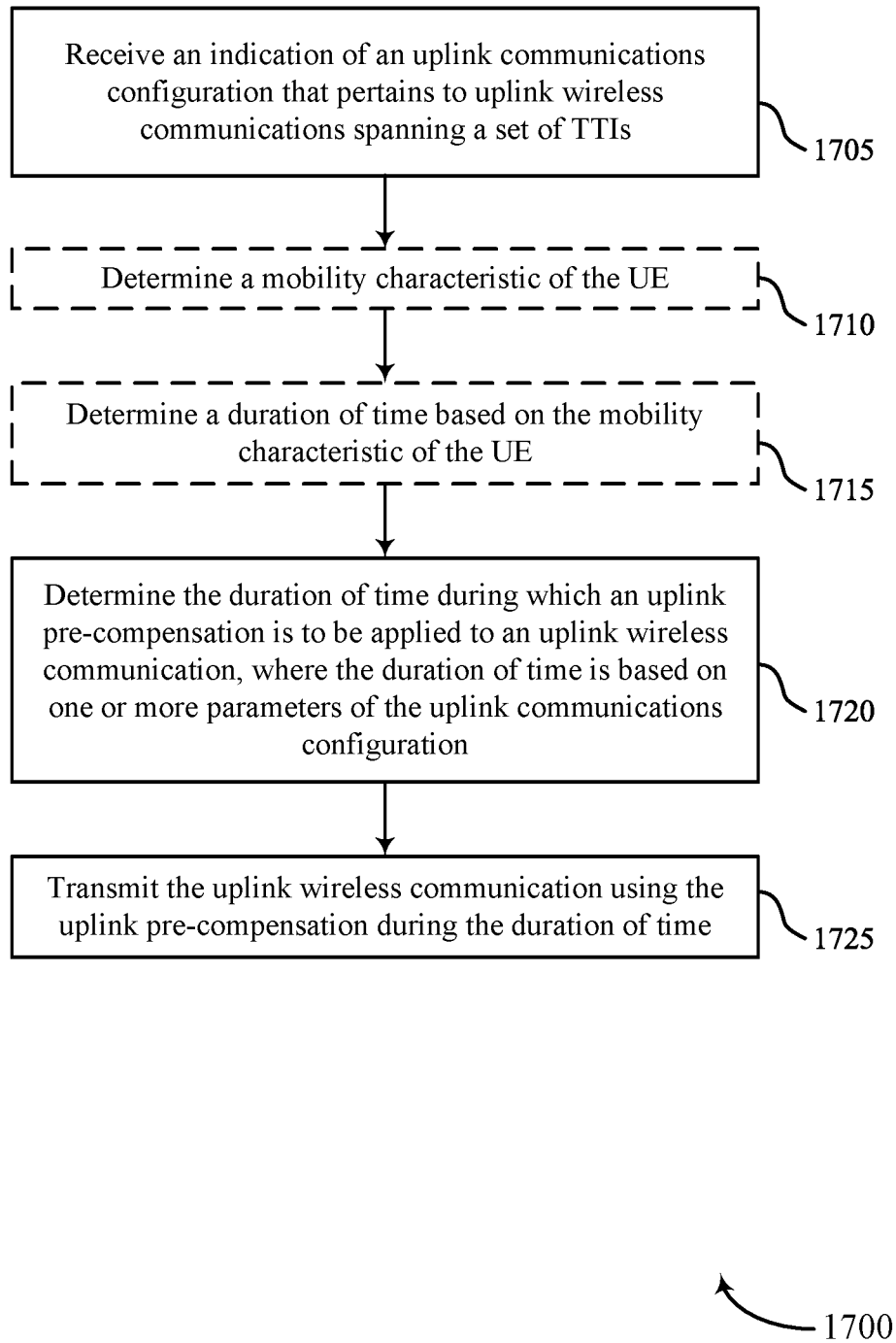

FIG. 17 shows a flowchart illustrating a method 1700 that supports uplink pre-compensation in wireless communications systems in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving an indication of an uplink communications configuration that pertains to uplink wireless communications spanning a set of TTIs. The operations of 1705 may be performed in accordance with examples as disclosed herein. In some examples, aspects of the operations of 1705 may be performed by a configuration component 725 as described with reference to FIG. 7.

At 1710, the method may include determining a mobility characteristic of the UE. The operations of 1710 may be performed in accordance with examples as disclosed herein. In some examples, aspects of the operations of 1710 may be performed by a speed component 755 as described with reference to FIG. 7.

At 1715, the method may include determining a duration of time based on the mobility characteristic of the UE. The operations of 1715 may be performed in accordance with examples as disclosed herein. In some examples, aspects of the operations of 1715 may be performed by a timing component 730 as described with reference to FIG. 7.

At 1720, the method may include determining the duration of time during which an uplink pre-compensation is to be applied to an uplink wireless communication, where the duration of time is based on one or more parameters of the uplink communications configuration. The operations of 1720 may be performed in accordance with examples as disclosed herein. In some examples, aspects of the operations of 1720 may be performed by a timing component 730 as described with reference to FIG. 7.

At 1725, the method may include transmitting the uplink wireless communication using the uplink pre-compensation during the duration of time. The operations of 1725 may be performed in accordance with examples as disclosed herein. In some examples, aspects of the operations of 1725 may be performed by an uplink component 735 as described with reference to FIG. 7.

Figure 18:
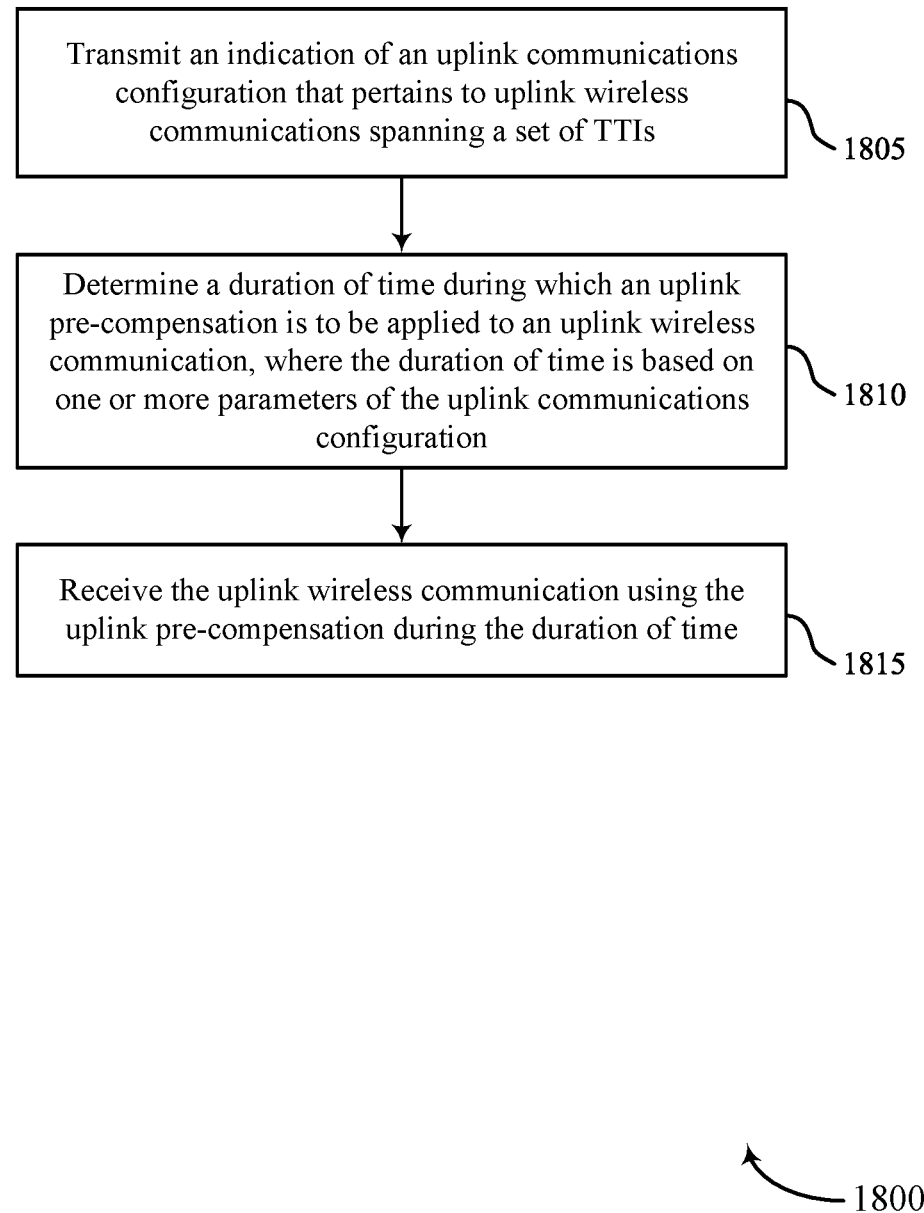

FIG. 18 shows a flowchart illustrating a method 1800 that supports uplink pre-compensation in wireless communications systems in accordance with one or more aspects of the present disclosure. The operations of the method 1800 may be implemented by a network entity (e.g., a base station) or components of a network entity, as described herein. For example, the operations of the method 1800 may be performed by a base station 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1805, the method may include transmitting an indication of an uplink communications configuration that pertains to uplink wireless communications spanning a set of TTIs. The operations of 1805 may be performed in accordance with examples as disclosed herein. In some examples, aspects of the operations of 1805 may be performed by a configuration component 1125 as described with reference to FIG. 11.

At 1810, the method may include determining a duration of time during which an uplink pre-compensation is to be applied to an uplink wireless communication, where the duration of time is based on one or more parameters of the uplink communications configuration. The operations of 1810 may be performed in accordance with examples as disclosed herein. In some examples, aspects of the operations of 1810 may be performed by a timing component 1130 as described with reference to FIG. 11.

At 1815, the method may include receiving the uplink wireless communication using the uplink pre-compensation during the duration of time. The operations of 1815 may be performed in accordance with examples as disclosed herein. In some examples, aspects of the operations of 1815 may be performed by an uplink component 1135 as described with reference to FIG. 11.

Figure 19:
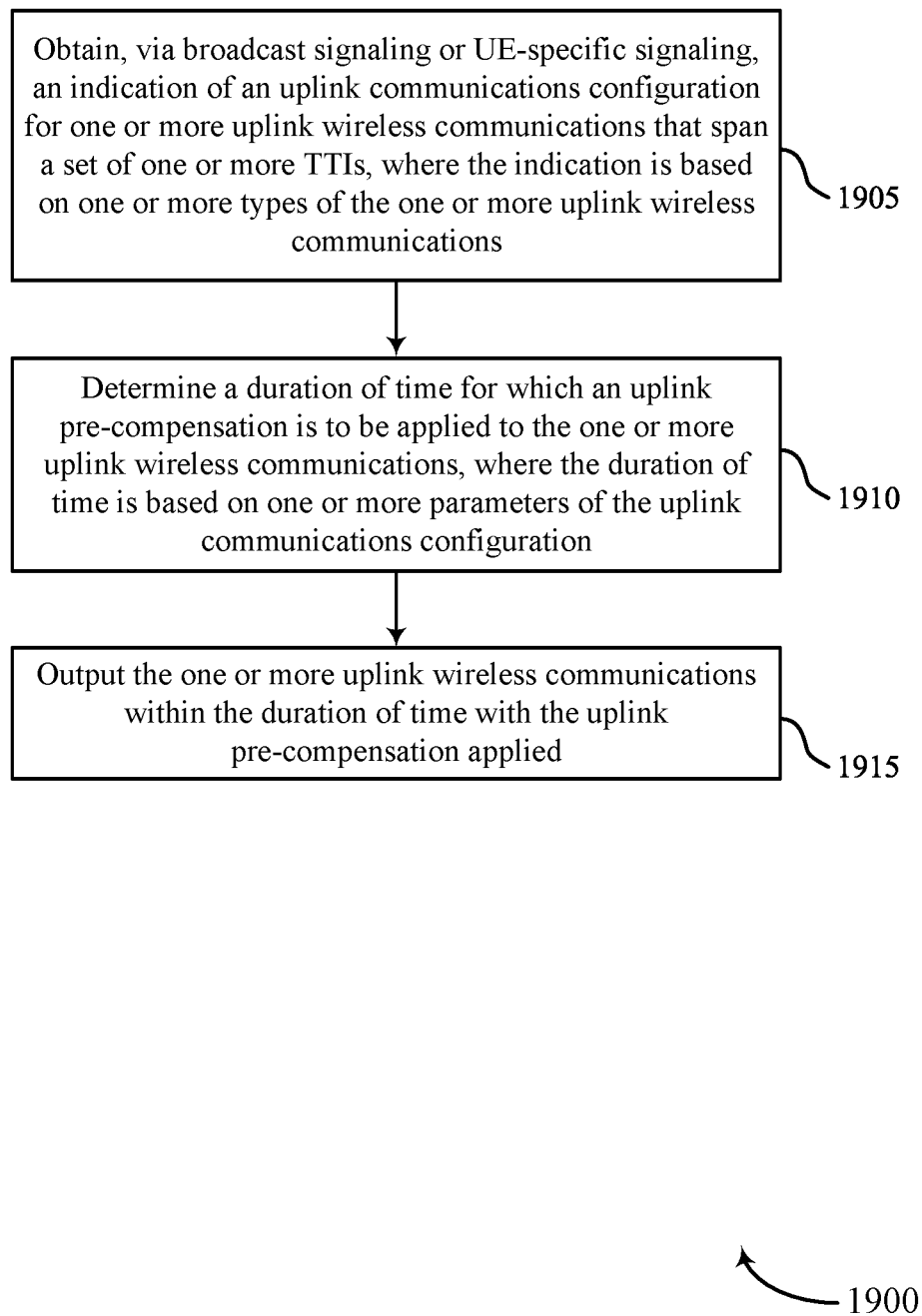

FIG. 19 shows a flowchart illustrating a method 1900 that supports uplink pre-compensation in wireless communications systems in accordance with one or more aspects of the present disclosure. The operations of the method 1900 may be implemented by a UE or components of a UE, as described herein. For example, the operations of the method 1900 may be performed by a UE 115, as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1905, the method may include obtaining, via broadcast signaling or UE-specific signaling, an indication of an uplink communications configuration for one or more uplink wireless communications that span a set of one or more TTIs, where the indication is based on one or more types of the one or more uplink wireless communications. The operations of 1905 may be performed in accordance with examples disclosed herein. In some examples, aspects of the operations of 1905 may be performed by a configuration component 725 described with reference to FIG. 7.

At 1910, the method may include determining a duration of time for which an uplink pre-compensation is to be applied to the one or more uplink wireless communications, where the duration of time is based on one or more parameters of the uplink communications configuration. The operations of 1910 may be performed in accordance with examples disclosed herein. In some examples, aspects of the operations of 1910 may be performed by a timing component 730 described with reference to FIG. 7.

At 1915, the method may include outputting the one or more uplink wireless communications within the duration of time with the uplink pre-compensation applied. The operations of 1915 may be performed in accordance with examples disclosed herein. In some examples, aspects of the operations of 1915 may be performed by an uplink component 735 described with reference to FIG. 7.

Figure 20:
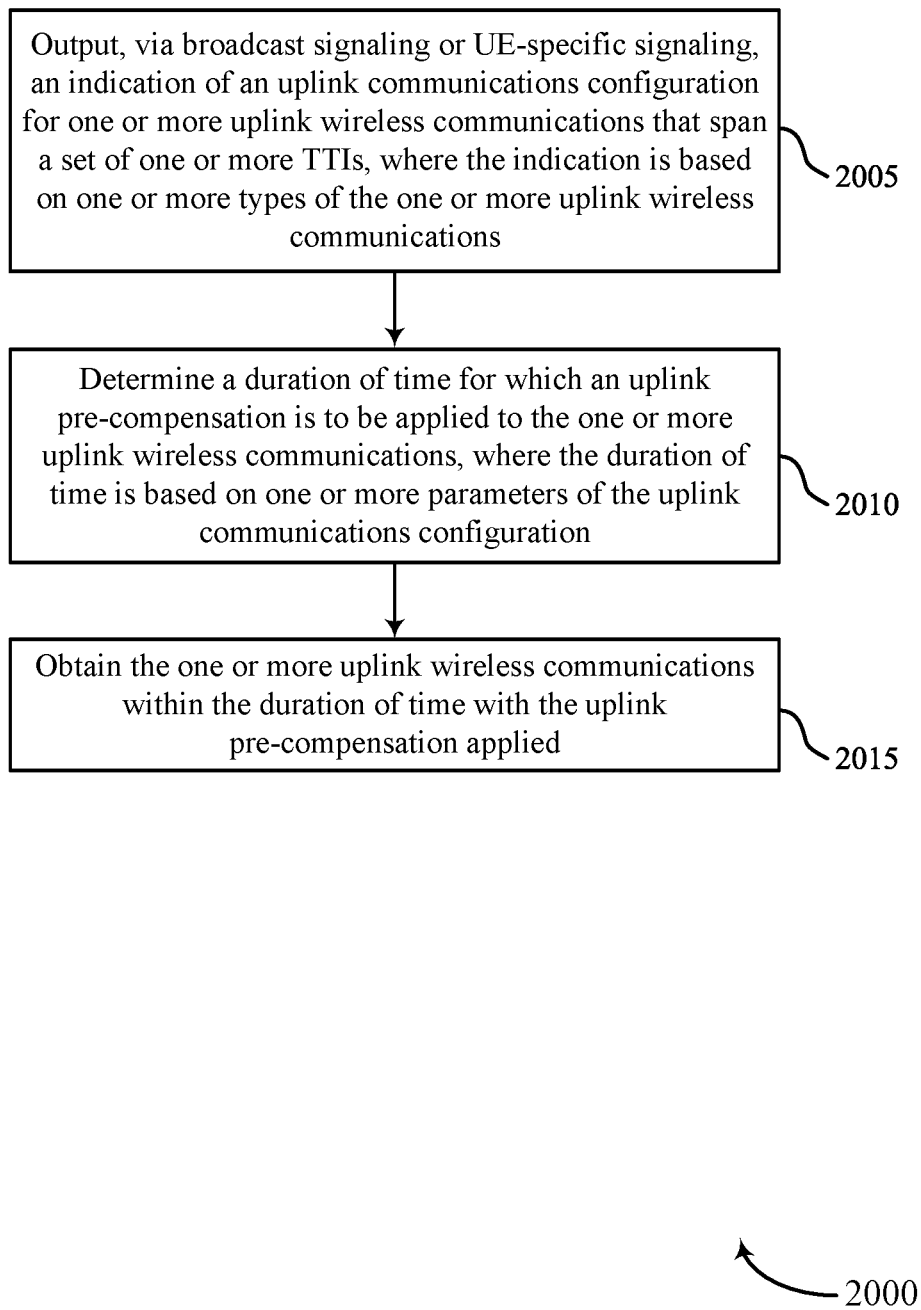

FIG. 20 shows a flowchart illustrating a method 2000 that supports uplink pre-compensation in wireless communications systems in accordance with one or more aspects of the present disclosure. The operations of the method 2000 may be implemented by a network entity (e.g., a base station) or components of a network entity, as described herein. For example, the operations of the method 2000 may be performed by a base station 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 2005, the method may include outputting, via broadcast signaling or UE-specific signaling, an indication of an uplink communications configuration for one or more uplink wireless communications that span a set of one or more TTIs, where the indication is based on one or more types of the one or more uplink wireless communications. The operations of 2005 may be performed in accordance with examples disclosed herein. In some examples, aspects of the operations of 2005 may be performed by a configuration component 1125 described with reference to FIG. 11.

At 2010, the method may include determining a duration of time for which an uplink pre-compensation is to be applied to the one or more uplink wireless communications, where the duration of time is based on one or more parameters of the uplink communications configuration. The operations of 2010 may be performed in accordance with examples disclosed herein. In some examples, aspects of the operations of 2010 may be performed by a timing component 1130 described with reference to FIG. 11.

At 2015, the method may include obtaining the one or more uplink wireless communications within the duration of time with the uplink pre-compensation applied. The operations of 2015 may be performed in accordance with examples disclosed herein. In some examples, aspects of the operations of 2015 may be performed by an uplink component 1135 described with reference to FIG. 11.

The following provides an overview of aspects of the present disclosure:

Aspect 1: A method for wireless communication at a UE, comprising: obtaining, via broadcast signaling or UE-specific signaling, an indication of an uplink communications configuration for one or more uplink wireless communications that span a set of one or more transmission time intervals, wherein the indication is based at least in part on one or more types of the one or more uplink wireless communications; determining a duration of time for which an uplink pre-compensation is to be applied to the one or more uplink wireless communications, wherein the duration of time is based at least in part on one or more parameters of the uplink communications configuration; and outputting the one or more uplink wireless communications within the duration of time with the uplink pre-compensation applied.

Aspect 2: The method of aspect 1, wherein determining the duration of time for which the uplink pre-compensation is to be applied comprises: determining a type of satellite orbit associated with a satellite to which the UE outputs the one or more uplink wireless communications; and determining the duration of time based at least in part on the one or more parameters of the uplink communications configuration, wherein the one or more parameters indicate the type of satellite orbit associated with the satellite.

Aspect 3: The method of aspect 2, further comprising: determining that the type of satellite orbit comprises one or more of a geostationary equatorial orbit or a low-earth orbit; and determining the duration of time based at least in part on the one or more parameters of the uplink communications configuration, wherein the one or more parameters indicate that the type of satellite orbit comprises one or more of the geostationary equatorial orbit or the low-earth orbit.

Aspect 4: The method of any of aspects 1 through 3, wherein determining the duration of time for which the uplink pre-compensation is to be applied comprises: determining that frequency hopping is enabled for the one or more uplink wireless communications that span the set of one or more transmission time intervals; determining a frequency hopping interval for the one or more uplink wireless communications that span the set of one or more transmission time intervals; and determining the duration of time based at least in part on the one or more parameters of the uplink communications configuration, wherein the one or more parameters indicate that the frequency hopping is enabled for the one or more uplink wireless communications and for the frequency hopping interval.

Aspect 5: The method of aspect 4, further comprising: determining a second duration of time for which the uplink pre-compensation is to be applied when the frequency hopping is disabled; and determining the duration of time based at least in part on whether a time duration of the frequency hopping interval is longer or shorter than the second duration of time.

Aspect 6: The method of aspect 5, wherein the duration of time is equal to the second duration of time when the time duration of the frequency hopping interval is larger than the second duration of time, or the duration of time is equal to the frequency hopping interval when the time duration of the frequency hopping interval is smaller than the second duration of time.

Aspect 7: The method of any of aspects 1 through 6, wherein the broadcast signaling comprises one or more of a system information block message or a physical random access channel message; and the UE-specific signaling comprises one or more dedicated radio resource control messages.

Aspect 8: The method of any of aspects 1 through 7, wherein the uplink communications configuration corresponds to a physical random access channel configuration, and the one or more uplink wireless communications correspond to one or more physical random access channel preambles for contention-based random access, and the physical random access channel configuration indicates a respective duration of time for which a respective uplink pre-compensation is to be applied to a respective physical random access channel preamble of the one or more physical random access channel preambles.

Aspect 9: The method of aspect 8, wherein the respective duration of time for which the respective uplink pre-compensation is to be applied to the respective physical random access channel preamble of the one or more physical random access channel preambles is based at least in part on a respective number of repetitions associated with each respective physical random access channel preamble.

Aspect 10: The method of any of aspects 1 through 9, further comprising: outputting one or both of a request to update the duration of time or a UE assistance information that indicates the duration of time.

Aspect 11: The method of any of aspects 1 through 10, wherein the uplink communications configuration is applicable to narrowband Internet of Things communications, enhanced machine-type communications, or New Radio communications in a non-terrestrial network.

Aspect 12: The method of any of aspects 1 through 11, wherein determining the duration of time for which the uplink pre-compensation is to be applied comprises: obtaining a downlink communication from a satellite; determining whether a communication link from a ground gateway to the satellite is pre-compensated based at least in part on the downlink communication; and determining the duration of time based at least in part on whether the communication link from the ground gateway to the satellite is pre-compensated.

Aspect 13: The method of aspect 12, wherein the duration of time is based at least in part on whether the communication link from the ground gateway to the satellite is pre-compensated.

Aspect 14: The method of any of aspects 1 through 13, wherein determining the duration of time for which the uplink pre-compensation is to be applied comprises: determining a mobility characteristic of the UE; and determining the duration of time based at least in part on the mobility characteristic of the UE.

Aspect 15: The method of any of aspects 1 through 14, further comprising: determining an updated uplink pre-compensation after an expiration of a first instance associated with the duration of time; and applying the updated uplink pre-compensation in a second instance associated with the duration of time for which the updated uplink pre-compensation is to be applied to the one or more uplink wireless communications.

Aspect 16: The method of any of aspects 1 through 15, wherein the UE comprises: an antenna, an antenna panel, or both.

Aspect 17: A method for wireless communication at a network entity, comprising: outputting, via broadcast signaling or UE-specific signaling, an indication of an uplink communications configuration for one or more uplink wireless communications that span a set of one or more transmission time intervals, wherein the indication is based at least in part on one or more types associated with the one or more uplink wireless communications; determining a duration of time for which an uplink pre-compensation is to be applied to the one or more uplink wireless communications, wherein the duration of time is based at least in part on one or more parameters of the uplink communications configuration; and obtaining the one or more uplink wireless communications within the duration of time with the uplink pre-compensation applied.

Aspect 18: The method of aspect 17, wherein determining the duration of time for which the uplink pre-compensation is to be applied comprises: determining a type of satellite orbit associated with the network entity, wherein the network entity comprises a satellite; and determining the duration of time based at least in part on the one or more parameters of the uplink communications configuration, wherein the one or more parameters indicate the type of satellite orbit associated with the satellite.

Aspect 19: The method of aspect 18, further comprising: determining that the type of satellite orbit comprises one or more of a geostationary equatorial orbit or a low-earth orbit; and determining the duration of time based at least in part on the one or more parameters of the uplink communications configuration, wherein the one or more parameters indicate that the type of satellite orbit comprises one or more of the geostationary equatorial orbit or the low-earth orbit.

Aspect 20: The method of aspect 19, wherein a respective duration of time for which the uplink pre-compensation is to be applied for the geostationary equatorial orbit is greater than a respective duration of time in which the uplink pre-compensation is to be applied for the low-earth orbit.

Aspect 21: The method of any of aspects 17 through 20, wherein determining the duration of time for which the uplink pre-compensation is to be applied comprises: determining that frequency hopping is enabled for the one or more uplink wireless communications that span the set of one or more transmission time intervals; determining a frequency hopping interval for the one or more uplink wireless communications that span the set of one or more transmission time intervals; and determining the duration of time based at least in part on the one or more parameters of the uplink communications configuration, wherein the one or more parameters indicate that the frequency hopping is enabled for the one or more uplink wireless communications and for the frequency hopping interval.

Aspect 22: The method of aspect 21, further comprising: determining a second duration of time for which the uplink pre-compensation is to be applied when the frequency hopping is disabled; and determining the duration of time based at least in part on whether a time duration of the frequency hopping interval is longer or shorter than the second duration of time.

Aspect 23: The method of aspect 22, wherein the duration of time is equal to the second duration of time when the time duration of the frequency hopping interval is larger than the second duration of time, or the duration of time is equal to the frequency hopping interval when the time duration of the frequency hopping interval is smaller than the second duration of time.

Aspect 24: The method of any of aspects 17 through 23, wherein the broadcast signaling comprises one or more of a system information block message or a physical random access channel message; and the UE-specific signaling comprises one or more dedicated radio resource control messages.

Aspect 25: The method of any of aspects 17 through 24, wherein the uplink communications configuration corresponds to a physical random access channel configuration, and the one or more uplink wireless communications correspond to one or more physical random access channel preambles for contention-based random access, and the physical random access channel configuration indicates a respective duration of time for which a respective uplink pre-compensation is to be applied to a respective physical random access channel preamble of each of the one or more physical random access channel preambles.

Aspect 26: The method of aspect 25, wherein the respective duration of time for which the respective uplink pre-compensation is to be applied to the respective physical random access channel preamble of the one or more physical random access channel preambles is based at least in part on a respective number of repetitions associated with each respective physical random access channel preamble.

Aspect 27: The method of any of aspects 17 through 26, further comprising: outputting one or more of a radio resource control message, a medium access control-control element, or a downlink control information that indicates the duration of time.

Aspect 28: The method of any of aspects 17 through 27, wherein the network entity comprises: an antenna, an antenna panel, or both.

Aspect 29: An apparatus for wireless communication at a UE, comprising: a processor; and memory coupled with the processor, the processor configured to perform a method of any of aspects 1 through 16.

Aspect 30: An apparatus for wireless communication at a UE, comprising: at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communication at a network entity, comprising: a processor; and memory coupled with the processor, the processor configured to perform a method of any of aspects 17 through 28.

Aspect 33: An apparatus for wireless communication at a network entity, comprising: at least one means for performing a method of any of aspects 17 through 28.

Aspect 34: A non-transitory computer-readable medium storing code for wireless communication at a network entity, the code comprising instructions executable by a processor to perform a method of any of aspects 17 through 28.

Aspect 35: A method for wireless communication at a UE, comprising: receiving an indication of an uplink communications configuration that pertains to uplink wireless communications spanning a set of TTIs; determining a duration of time during which an uplink pre-compensation is to be applied to an uplink wireless communication, wherein the duration of time is based at least in part on one or more parameters of the uplink communications configuration; and transmitting the uplink wireless communication using the uplink pre-compensation during the duration of time.

Aspect 36: The method of aspect 35, wherein determining the duration of time during which the uplink pre-compensation is to be applied further comprises: determining a type of satellite orbit associated with a satellite to which the UE transmits the uplink wireless communication; and determining the duration of time based at least in part on the one or more parameters of the uplink communications configuration indicating the type of satellite orbit associated with the satellite.

Aspect 37: The method of aspect 36, further comprising: determining that the type of satellite orbit comprises one or more of a GEO or a LEO; and determining the duration of time based at least in part on the one or more parameters of the uplink communications configuration indicating that the type of satellite orbit comprises one or more of the GEO or the LEO.

Aspect 38: The method of aspect 37, wherein a respective duration of time during which the uplink pre-compensation is to be applied for the GEO is greater than a respective duration of time during which the uplink pre-compensation is to be applied for the LEO.

Aspect 39: The method of any of aspects 35 through 38, wherein determining the duration of time during which the uplink pre-compensation is to be applied further comprises: receiving a downlink communication from a satellite; determining whether a communication link from a ground gateway to a satellite is pre-compensated based at least in part on the downlink communication; and determining the duration of time based at least in part on whether the communication link from the ground gateway to the satellite is pre-compensated.

Aspect 40: The method of aspect 39, wherein the duration of time differs based at least in part on whether the communication link from the ground gateway to the satellite is pre-compensated.

Aspect 41: The method of any of aspects 35 through 40, wherein determining the duration of time during which the uplink pre-compensation is to be applied further comprises: determining that frequency hopping is enabled for the uplink wireless communication spanning the set of TTIs; and determining a frequency hopping interval for the uplink wireless communication spanning the set of TTIs; and determining the duration of time based at least in part on the one or more parameters of the uplink communications configuration indicating that frequency hopping is enabled for the uplink wireless communication and the frequency hopping interval.

Aspect 42: The method of aspect 41, further comprising: determining a second duration of time during which the uplink pre-compensation is to be applied when the frequency hopping is disabled; and determining the duration of time based at least in part on whether the frequency hopping interval is larger or smaller than the second duration of time.

Aspect 43: The method of aspect 42, wherein the duration of time is equal to the second duration of time based at least in part on that the frequency hopping interval is larger than the second duration of time, or the duration of time is equal to the frequency hopping interval based at least in part on that the frequency hopping interval is smaller than the second duration of time.

Aspect 44: The method of any of aspects 35 through 43, wherein determining the duration of time during which the uplink pre-compensation is to be applied further comprises: determining a mobility characteristic of the UE; and determining the duration of time based at least in part on the mobility characteristic of the UE.

Aspect 45: The method of any of aspects 35 through 44, wherein the duration of time differs based at least in part on whether the uplink pre-compensation is for mitigation of a propagation delay or a Doppler frequency shift.

Aspect 46: The method of any of aspects 35 through 45, wherein determining the duration of time during which the uplink pre-compensation is to be applied further comprises: receiving one or more of an RRC message, a MAC-CE, or a DCI comprising an indication of the duration of time.

Aspect 47: The method of aspect 46, further comprising: transmitting a request to update the duration of time or UE assistance information comprising an indication of the duration of time.

Aspect 48: The method of any of aspects 35 through 47, wherein the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of the one or more PRACH preambles.

Aspect 49: The method of aspect 48, wherein the respective duration of time during which the respective uplink pre-compensation is to be applied to the respective PRACH preamble of the one or more PRACH preambles is based at least in part on a respective number of repetitions associated with each respective PRACH preamble.

Aspect 50: The method of any of aspects 35 through 49, further comprising: determining an updated uplink pre-compensation after an expiration of a first instance associated with the duration of time; and applying the updated uplink pre-compensation during a second instance associated with the duration of time in which the updated uplink pre-compensation is to be applied to the uplink wireless communication.

Aspect 51: A method for wireless communication at a base station, comprising: transmitting an indication of an uplink communications configuration that pertains to uplink wireless communications spanning a set of TTIs; determining a duration of time during which an uplink pre-compensation is to be applied to an uplink wireless communication, wherein the duration of time is based at least in part on one or more parameters of the uplink communications configuration; and receiving the uplink wireless communication using the uplink pre-compensation during the duration of time.

Aspect 52: The method of aspect 51, wherein determining the duration of time during which the uplink pre-compensation is to be applied further comprises: determining a type of satellite orbit associated with the base station to which the UE transmits the uplink wireless communication, the base station comprising a satellite; and determining the duration of time based at least in part on the one or more parameters of the uplink communications configuration indicating the type of satellite orbit associated with the satellite.

Aspect 53: The method of aspect 52, further comprising: determining that the type of satellite orbit comprises one or more of a GEO or a LEO; and determining the duration of time based at least in part on the one or more parameters of the uplink communications configuration indicating that the type of satellite orbit comprises one or more of the GEO or the LEO.

Aspect 54: The method of aspect 53, wherein a respective duration of time during which the uplink pre-compensation is to be applied for the GEO is greater than a respective duration of time during which the uplink pre-compensation is to be applied for the LEO.

Aspect 55: The method of any of aspects 51 through 54, wherein determining the duration of time during which the uplink pre-compensation is to be applied further comprises: determining whether a communication link from a ground gateway to the base station is pre-compensated; and determining the duration of time based at least in part on whether the communication link from the ground gateway to the base station is pre-compensated.

Aspect 56: The method of aspect 55, wherein the duration of time differs based at least in part on whether the communication link from the ground gateway to the base station is pre-compensated.

Aspect 57: The method of any of aspects 51 through 56, wherein determining the duration of time during which the uplink pre-compensation is to be applied further comprises: determining that frequency hopping is enabled for the uplink wireless communication spanning the set of TTIs; and determining a frequency hopping interval for the uplink wireless communication spanning the set of TTIs; and determining the duration of time based at least in part on the one or more parameters of the uplink communications configuration indicating that frequency hopping is enabled for the uplink wireless communication and the frequency hopping interval.

Aspect 58: The method of aspect 57, further comprising: determining a second duration of time during which the uplink pre-compensation is to be applied when the frequency hopping is disabled; and determining the duration of time based at least in part on whether the frequency hopping interval is larger or smaller than the second duration of time.

Aspect 59: The method of aspect 58, the duration of time is equal to the second duration of time based at least in part on that the frequency hopping interval is larger than the second duration of time, or the duration of time is equal to the frequency hopping interval based at least in part on that the frequency hopping interval is smaller than the second duration of time.

Aspect 60: The method of any of aspects 51 through 59, wherein determining the duration of time during which the uplink pre-compensation is to be applied further comprises: determining a mobility characteristic of the UE; and determining the duration of time based at least in part on the mobility characteristic of the UE.

Aspect 61: The method of any of aspects 51 through 60, wherein the duration of time differs based at least in part on whether the uplink pre-compensation is for mitigation of a propagation delay or a Doppler frequency shift.

Aspect 62: The method of any of aspects 51 through 61, further comprising: transmitting one or more of an RRC message, a MAC-CE, or a DCI comprising an indication of the duration of time.

Aspect 63: The method of aspect 62, further comprising: receiving a request to update the duration of time or UE assistance information comprising an indication of the duration of time.

Aspect 64: The method of any of aspects 51 through 63, wherein the uplink communications configuration corresponds to a PRACH configuration and the uplink wireless communications corresponds to one or more PRACH preambles for contention-based random access, the PRACH configuration indicating a respective duration of time during which a respective uplink pre-compensation is to be applied to a respective PRACH preamble of each of the one or more PRACH preambles.

Aspect 65: The method of aspect 64, wherein the respective duration of time during which the respective uplink pre-compensation is to be applied to the respective PRACH preamble of the one or more PRACH preambles is based at least in part on a respective number of repetitions associated with each respective PRACH preamble.

Aspect 66: The method of any of aspects 61 through 65, further comprising: determining an updated uplink pre-compensation after an expiration of a first instance associated with the duration of time; and applying the updated uplink pre-compensation during a second instance associated with the duration of time in which the updated uplink pre-compensation is to be applied to the uplink wireless communication.

Aspect 67: An apparatus for wireless communication at a UE, comprising: a processor; and memory coupled to the processor, the processor and memory configured to perform a method of any of aspects 35 through 50.

Aspect 68: An apparatus for wireless communication at a UE, comprising: at least one means for performing a method of any of aspects 35 through 50.

Aspect 69: A non-transitory computer-readable medium storing code for wireless communication at a UE, the code comprising instructions executable by a processor to perform a method of any of aspects 35 through 50.

Aspect 70: An apparatus for wireless communication at a base station, comprising: a processor; and memory coupled to the processor, the processor and memory configured to perform a method of any of aspects 51 through 66.

Aspect 71: An apparatus for wireless communication at a base station, comprising: at least one means for performing a method of any of aspects 51 through 66.

Aspect 72: A non-transitory computer-readable medium storing code for wireless communication at a base station, the code comprising instructions executable by a processor to perform a method of any of aspects 51 through 66.

It should be noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication that comprises:
    a processor; and
    memory coupled with the processor, the processor configured to:
        obtain, via broadcast signaling or user equipment (UE)-specific signaling, an indication of an uplink communications configuration for one or more uplink wireless communications that span a set of one or more transmission time intervals, wherein the indication is based at least in part on one or more types associated with the one or more uplink wireless communications;
        determine a first duration of time for which uplink pre-compensation is to be applied when frequency hopping is disabled or enabled;
        determine a second duration of time for which the uplink pre-compensation is to be applied to the one or more uplink wireless communications based at least in part on one or more parameters of the uplink communications configuration and based at least in part on a frequency hopping interval of the one or more uplink wireless communications relative to the first duration of time, wherein the one or more parameters of the uplink communications configuration includes one or more of a type of satellite orbit, an enablement or disablement of frequency hopping, and a physical random access channel configuration; and
        output the one or more uplink wireless communications within the second duration of time with the uplink pre-compensation applied.

2. The apparatus of claim 1, wherein, to determine the second duration of time for which the uplink pre-compensation is to be applied, the processor is further configured to:
    determine the type of satellite orbit associated with a satellite to which the apparatus outputs the one or more uplink wireless communications; and
    determine the second duration of time based at least in part on the one or more parameters of the uplink communications configuration, wherein the one or more parameters indicate the type of satellite orbit associated with the satellite.

3. The apparatus of claim 2, wherein the processor is further configured to:
    determine that the type of satellite orbit comprises one or more of a geostationary equatorial orbit or a low-earth orbit; and
    determine the second duration of time based at least in part on the one or more parameters of the uplink communications configuration, wherein the one or more parameters indicate that the type of satellite orbit comprises one or more of the geostationary equatorial orbit or the low-earth orbit.

4. The apparatus of claim 1, wherein the first duration of time is equal to the second duration of time when a duration of the frequency hopping interval is larger than the second duration of time, or wherein the first duration of time is equal to the frequency hopping interval when the duration of the frequency hopping interval is smaller than the second duration of time.

5. The apparatus of claim 1, wherein:
    the broadcast signaling comprises one or more of a system information block message or a physical random access channel message; and
    the UE-specific signaling comprises one or more dedicated radio resource control messages.

6. The apparatus of claim 1, wherein the uplink communications configuration corresponds to the physical random access channel configuration, and wherein the one or more uplink wireless communications correspond to one or more physical random access channel preambles for contention-based random access, and wherein the physical random access channel configuration indicates a respective duration of time for which a respective uplink pre-compensation is to be applied to a respective physical random access channel preamble of the one or more physical random access channel preambles.

7. The apparatus of claim 6, wherein the respective duration of time for which the respective uplink pre-compensation is to be applied to the respective physical random access channel preamble of the one or more physical random access channel preambles is based at least in part on a respective number of repetitions associated with each respective physical random access channel preamble.

8. The apparatus of claim 1, wherein the processor is further configured to:
    output one or both of a request to update the second duration of time or a UE assistance information that indicates the second duration of time.

9. The apparatus of claim 1, wherein the uplink communications configuration is applicable to narrowband Internet of Things communications, enhanced machine-type communications, or New Radio communications in a non-terrestrial network.

10. The apparatus of claim 1, wherein, to determine the second duration of time for which the uplink pre-compensation is to be applied, the processor is further configured to:
obtain a downlink communication from a satellite;
determine whether a communication link from a ground gateway to the satellite is pre-compensated based at least in part on the downlink communication; and
determine the second duration of time based at least in part on whether the communication link from the ground gateway to the satellite is pre-compensated.

11. The apparatus of claim 10, wherein the second duration of time is based at least in part on whether the communication link from the ground gateway to the satellite is pre-compensated.

12. The apparatus of claim 1, wherein, to determine the second duration of time for which the uplink pre-compensation is to be applied, the processor is further configured to:
determine a mobility characteristic of the apparatus; and
determine the second duration of time based at least in part on the mobility characteristic of the apparatus.

13. The apparatus of claim 1, wherein the processor is further configured to:
determine an updated uplink pre-compensation after an expiration of a first instance associated with the second duration of time; and
apply the updated uplink pre-compensation in a second instance associated with the second duration of time for which the updated uplink pre-compensation is to be applied to the one or more uplink wireless communications.

14. The apparatus of claim 1, wherein the apparatus further comprises:
an antenna or antenna panel, or both.

15. An apparatus for wireless communication that comprises:
a processor; and
memory coupled with the processor, the processor configured to:
output, via broadcast signaling or user equipment (UE)-specific signaling, an indication of an uplink communications configuration for one or more uplink wireless communications that span a set of one or more transmission time intervals, wherein the indication is based at least in part on one or more types associated with the one or more uplink wireless communications;
determine a first duration of time for which uplink pre-compensation is to be applied when frequency hopping is enabled or disabled;
determine a second duration of time for which the uplink pre-compensation is to be applied to the one or more uplink wireless communications based at least in part on one or more parameters of the uplink communications configuration and based at least in part on a frequency hopping interval of the one or more uplink wireless communications relative to the first duration of time, wherein the one or more parameters of the uplink communications configuration includes one or more of a type of satellite orbit, an enablement or disablement of frequency hopping, and a physical random access channel configuration; and
obtain the one or more uplink wireless communications within the second duration of time with the uplink pre-compensation applied.

16. The apparatus of claim 15, wherein, to determine the second duration of time for which the uplink pre-compensation is to be applied, the processor is further configured to:
determine the type of satellite orbit associated with the apparatus, wherein the apparatus comprises a satellite; and
determine the second duration of time based at least in part on the one or more parameters of the uplink communications configuration, wherein the one or more parameters indicate the type of satellite orbit associated with the satellite.

17. The apparatus of claim 16, wherein the processor is further configured to:
determine that the type of satellite orbit comprises one or more of a geostationary equatorial orbit or a low-earth orbit; and
determine the second duration of time based at least in part on the one or more parameters of the uplink communications configuration, wherein the one or more parameters indicate that the type of satellite orbit comprises one or more of the geostationary equatorial orbit or the low-earth orbit.

18. The apparatus of claim 17, wherein a respective duration of time for which the uplink pre-compensation is to be applied for the geostationary equatorial orbit is greater than a respective duration of time in which the uplink pre-compensation is to be applied for the low-earth orbit.

19. The apparatus of claim 15, wherein the first duration of time is equal to the second duration of time when a duration of the frequency hopping interval is larger than the second duration of time, or wherein the first duration of time is equal to the frequency hopping interval when the duration of the frequency hopping interval is smaller than the second duration of time.

20. The apparatus of claim 15, wherein:
the broadcast signaling comprises one or more of a system information block message or a physical random access channel message; and
the UE-specific signaling comprises one or more dedicated radio resource control messages.

21. The apparatus of claim 15, wherein the uplink communications configuration corresponds to the physical random access channel configuration, and wherein the one or more uplink wireless communications correspond to one or more physical random access channel preambles for contention-based random access, and wherein the physical random access channel configuration indicates a respective duration of time for which a respective uplink pre-compensation is to be applied to a respective physical random access channel preamble of each of the one or more physical random access channel preambles.

22. The apparatus of claim 21, wherein the respective duration of time for which the respective uplink pre-compensation is to be applied to the respective physical random access channel preamble of the one or more physical random access channel preambles is based at least in part on a respective number of repetitions associated with each respective physical random access channel preamble.

23. The apparatus of claim 15, wherein the processor is further configured to:
output one or more of a radio resource control message, a medium access control-control element, or a downlink control information that indicates the second duration of time.

24. The apparatus of claim 15, wherein the apparatus further comprises:
an antenna or antenna panel, or both.

25. A method for wireless communication at a user equipment (UE), comprising:
obtaining, via broadcast signaling or UE-specific signaling, an indication of an uplink communications configuration for one or more uplink wireless communications that span a set of one or more transmission time intervals, wherein the indication is based at least in part on one or more types of the one or more uplink wireless communications;
determining a first duration of time for which uplink pre-compensation is to be applied when frequency hopping is disabled or enabled;
determining a second duration of time for which the uplink pre-compensation is to be applied to the one or more uplink wireless communications based at least in part on one or more parameters of the uplink communications configuration and based at least in part on a frequency hopping interval of the one or more uplink wireless communications relative to the first duration of time, wherein the one or more parameters of the uplink communications configuration includes one or more of a type of satellite orbit, an enablement or disablement of frequency hopping, and a physical random access channel configuration; and
outputting the one or more uplink wireless communications within the second duration of time with the uplink pre-compensation applied.

26. The method of claim 25, wherein, determining the second duration of time for which the uplink pre-compensation is to be applied further comprises:
determining the type of satellite orbit associated with a satellite to which the UE outputs the one or more uplink wireless communications; and
determining the second duration of time based at least in part on the one or more parameters of the uplink communications configuration, wherein the one or more parameters indicate the type of satellite orbit associated with the satellite.

27. The method of claim 25, wherein the first duration of time is equal to the second duration of time when a duration of the frequency hopping interval is larger than the second duration of time, or wherein the first duration of time is equal to the frequency hopping interval when the duration of the frequency hopping interval is smaller than the second duration of time.

28. A method for wireless communication at a network entity, comprising:
outputting, via broadcast signaling or user equipment (UE)-specific signaling, an indication of an uplink communications configuration for one or more uplink wireless communications that span a set of one or more transmission time intervals, wherein the indication is based at least in part on one or more types of the one or more uplink wireless communications;
determining a first duration of time for which uplink pre-compensation is to be applied when frequency hopping is disabled or enabled;
determining a second duration of time for which the uplink pre-compensation is to be applied to the one or more uplink wireless communications based at least in part on one or more parameters of the uplink communications configuration and based at least in part on a frequency hopping interval of the one or more uplink wireless communications relative to the first duration of time, wherein the one or more parameters of the uplink communications configuration includes one or more of a type of satellite orbit, an enablement or disablement of frequency hopping, and a physical random access channel configuration; and
obtaining the one or more uplink wireless communications within the second duration of time with the uplink pre-compensation applied.

29. The method of claim 28, wherein determining the second duration of time for which the uplink pre-compensation is to be applied further comprises:
determining the type of satellite orbit associated with the network entity, wherein the network entity comprises a satellite; and
determining the second duration of time based at least in part on the one or more parameters of the uplink communications configuration, wherein the one or more parameters indicate the type of satellite orbit associated with the satellite.

30. The method of claim 28, wherein the first duration of time is equal to the second duration of time when a duration of the frequency hopping interval is larger than the second duration of time, or wherein the first duration of time is equal to the frequency hopping interval when the duration of the frequency hopping interval is smaller than the second duration of time.

* * * * *